US 12,441,555 B2

(12) United States Patent
Carrasco

(10) Patent No.: US 12,441,555 B2
(45) Date of Patent: Oct. 14, 2025

(54) SUCTION UNIT FOR SUCTIONING AN OBJECT ACCORDING TO BERNOULLI'S PRINCIPLE AND SUCTION DEVICE INCLUDING SUCTION UNIT

(71) Applicant: A O FORMAFLON SWISS AG, Schocherswil (CH)

(72) Inventor: César Carrasco, Schocherswil (CH)

(73) Assignee: A O FORMAFLON SWISS AG, Schocherswil (CH)

( * ) Notice: Subject to any disclaimer, the term of this patent is extended or adjusted under 35 U.S.C. 154(b) by 911 days.

(21) Appl. No.: 17/636,741

(22) PCT Filed: Sep. 7, 2020

(86) PCT No.: PCT/EP2020/074977
§ 371 (c)(1),
(2) Date: Feb. 18, 2022

(87) PCT Pub. No.: WO2021/048069
PCT Pub. Date: Mar. 18, 2021

(65) Prior Publication Data
US 2022/0289500 A1    Sep. 15, 2022

(30) Foreign Application Priority Data

Sep. 10, 2019 (EP) .................................... 19196589
Nov. 8, 2019 (EP) .................................... 19208051
Jan. 15, 2020 (EP) .................................... 20152029

(51) Int. Cl.
*B25J 15/06*      (2006.01)
*B65G 47/91*      (2006.01)

(52) U.S. Cl.
CPC ......... *B65G 47/911* (2013.01); *B25J 15/0683* (2013.01); *B65G 2201/0202* (2013.01); *B65G 2201/022* (2013.01)

(58) Field of Classification Search
CPC . B25J 15/0683; B25J 15/0616; B65G 47/911; B65G 2201/022; B65G 2201/0202
(Continued)

(56) References Cited

U.S. PATENT DOCUMENTS 5,636,887 A    6/1997   Petropoulos et al.
6,604,888 B2 *   8/2003   Dolan ................... E01F 15/146
                                                     404/6

(Continued)

FOREIGN PATENT DOCUMENTS

DE        35 16941 A1    11/1986
DE        9208417 U1    10/1993

(Continued)

OTHER PUBLICATIONS

Dec. 4, 2020 International Search Report issued in International Patent Application No. PCT/EP2020/074977.

(Continued)

*Primary Examiner* — Paul T Chin
(74) *Attorney, Agent, or Firm* — GREENBLUM & BERNSTEIN, P.L.C.

(57) ABSTRACT

A suction unit, which serves for suctioning an object according to Bernoulli's principle, includes a suction body with an adjoining suction plate, which has a front side facing away from the suction body, and includes at least one entry channel, through which a gaseous medium is introducible through the suction body into a deflection channel, which is delimited on one side by the front side of the suction plate and on another by a deflection head of a deflection unit or by the suctioned object, and through which the gaseous medium is guidable to the outside. The suction plate has in the center a deflection chamber which is adjoined on one side by the at least one entry channel and on another side by a plurality of suction channels which are sunk into the (Continued)

Figure 1:
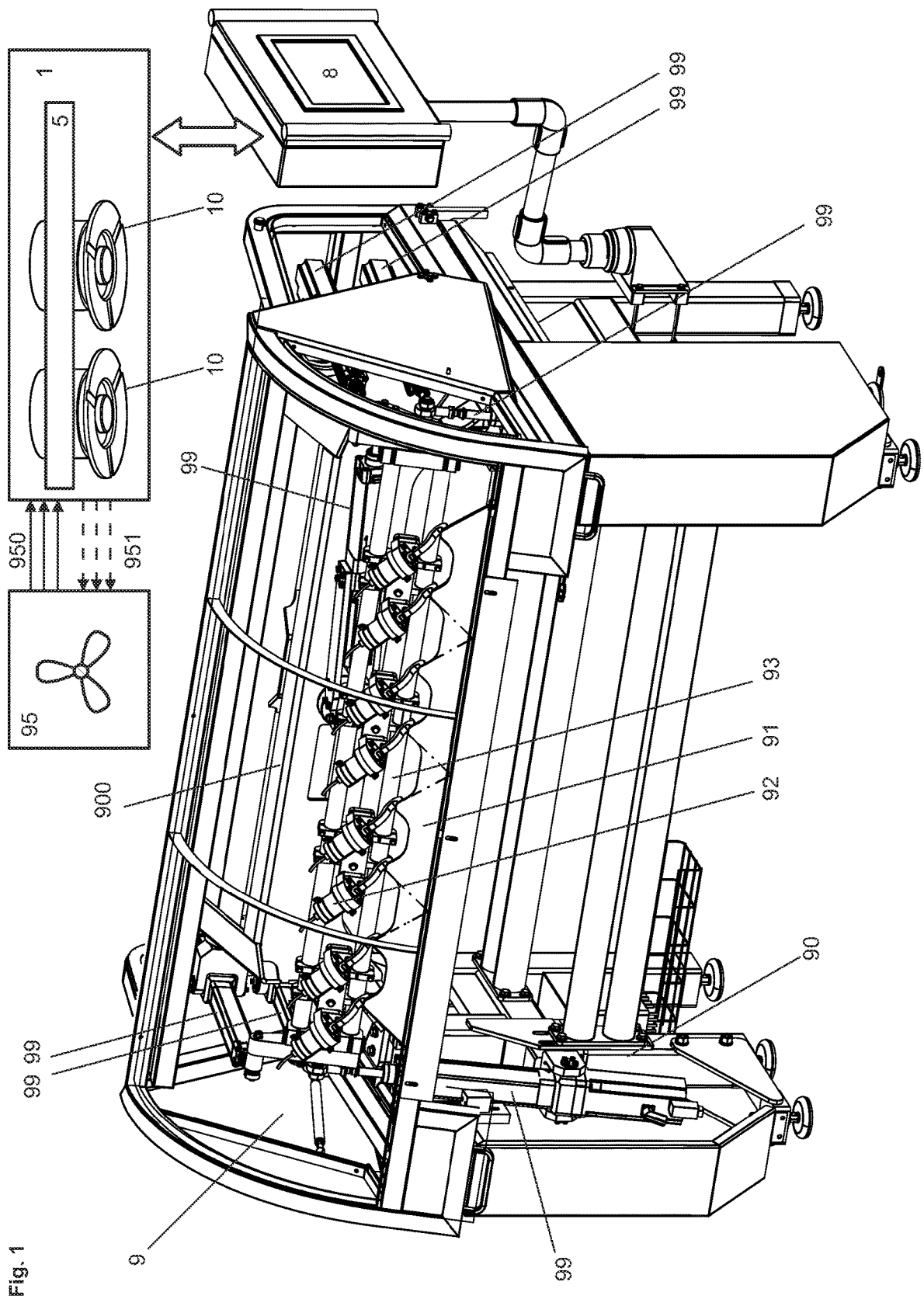

suction plate and extend towards the edge of the suction plate.

16 Claims, 22 Drawing Sheets

(58) Field of Classification Search
USPC .................................................. 294/64.3, 183
See application file for complete search history.

(56) References Cited

U.S. PATENT DOCUMENTS

| | | | | |
|---|---|---|---|---|
| 7,597,370 | B2* | 10/2009 | Tanae | B65G 47/91 |
| | | | | 294/64.3 |
| 9,381,652 | B2* | 7/2016 | Abe | B25J 15/0616 |
| 10,189,166 | B2* | 1/2019 | Iwasaka | B25J 15/0683 |
| 10,643,881 | B2* | 5/2020 | Iwasaka | H01L 21/6838 |
| 11,008,180 | B2* | 5/2021 | Iwasaka | B25J 15/06 |
| 11,037,809 | B2* | 6/2021 | Hung | H01L 21/67766 |
| 11,541,554 | B2* | 1/2023 | Nakayama | B25J 15/0683 |
| 2007/0131660 | A1 | 6/2007 | Tanae | |
| 2020/0164527 | A1 | 5/2020 | Iwasaka et al. | |

FOREIGN PATENT DOCUMENTS

| | | |
|---|---|---|
| DE | 20 2006 016 833 U1 | 4/2007 |
| DE | 10 2008 023 907 A1 | 12/2009 |
| EP | 2554500 A1 | 2/2013 |
| EP | 3530422 A1 | 8/2019 |
| FR | 1 391 432 A | 3/1965 |
| JP | S50-118147 A | 9/1975 |
| JP | S58-141536 A | 8/1983 |
| JP | 2010-114108 A | 5/2010 |
| JP | 2015-179741 A | 10/2015 |
| JP | 2019-055439 A | 4/2019 |
| WO | 2010/094343 A1 | 8/2010 |
| WO | 2017/017750 A1 | 2/2017 |
| WO | 2019/049890 A1 | 3/2019 |

OTHER PUBLICATIONS

Dec. 7, 2020 International Search Report issued in International Patent Application No. PCT/EP2020/074978.
U.S. Appl. No. 17/638,382, filed Feb. 25, 2022 in the name of César Carrasco.

* cited by examiner

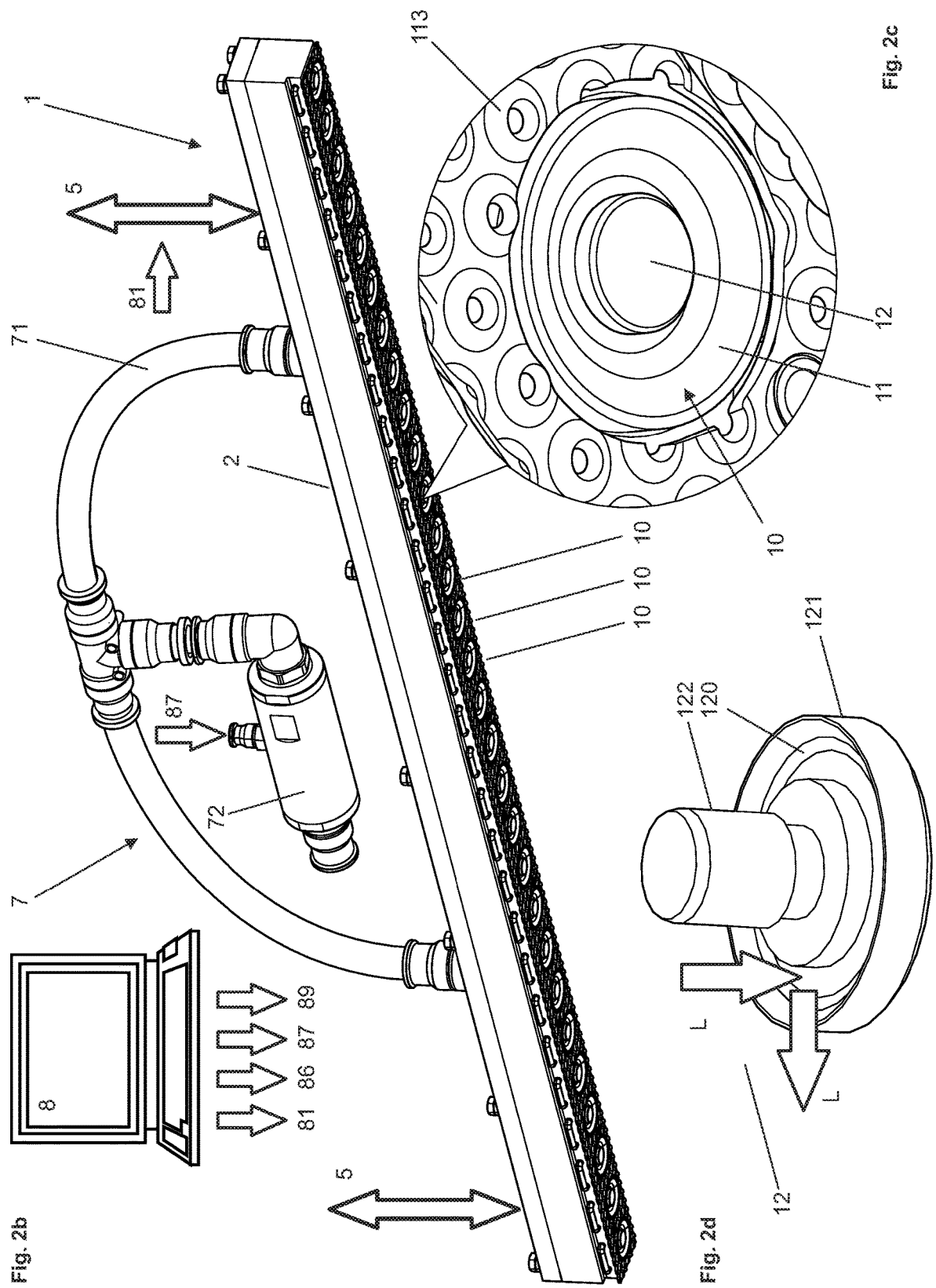

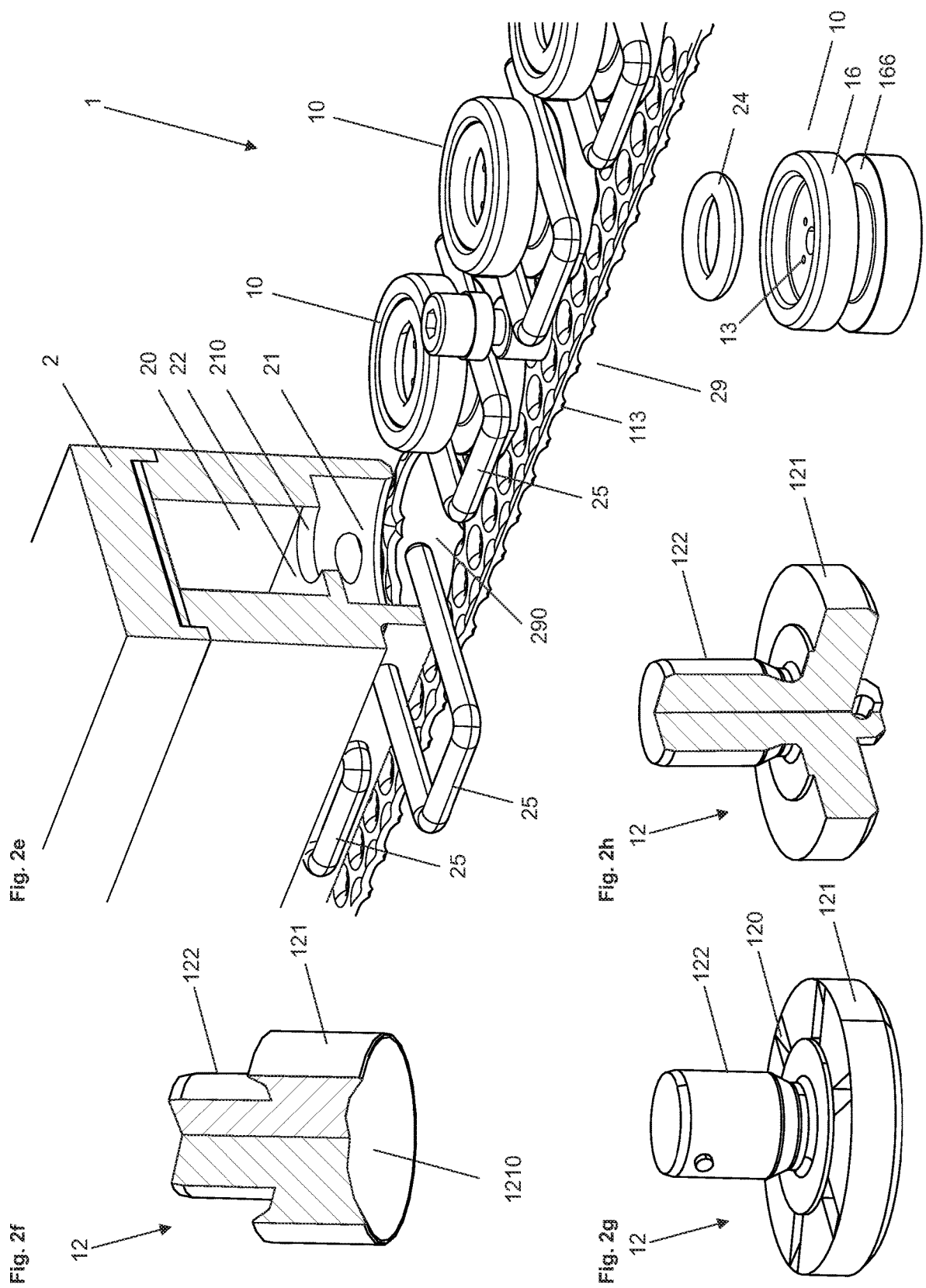

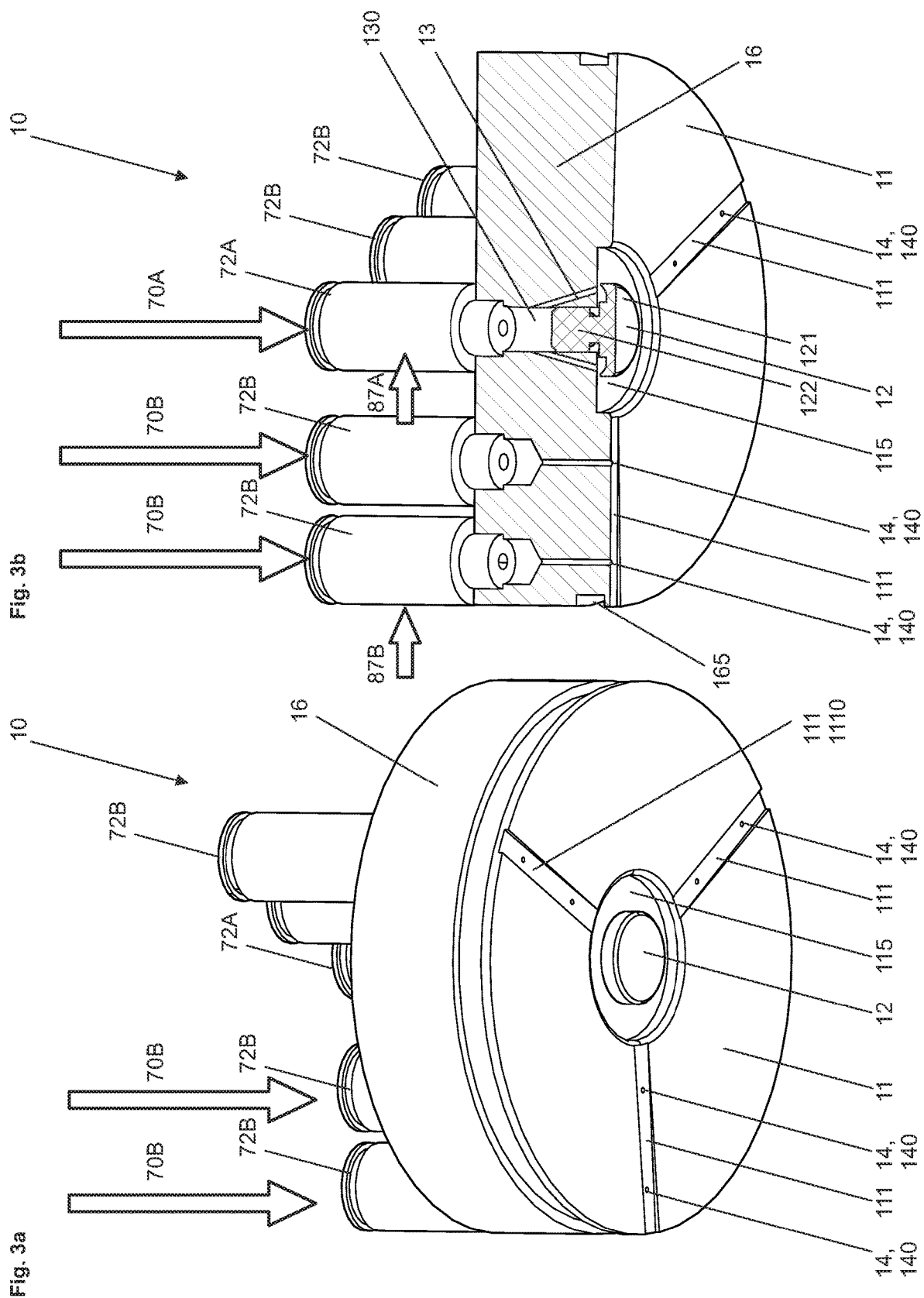

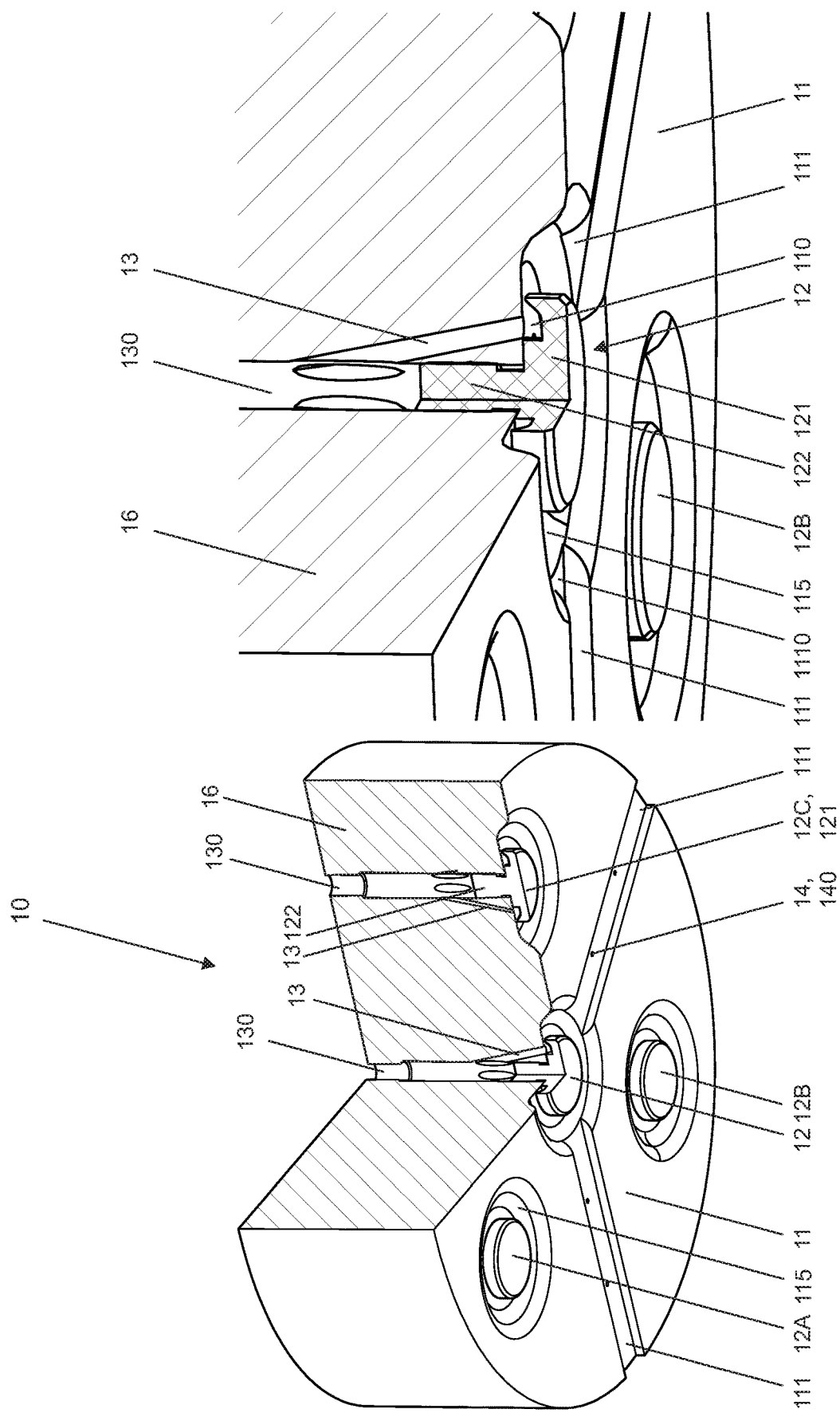

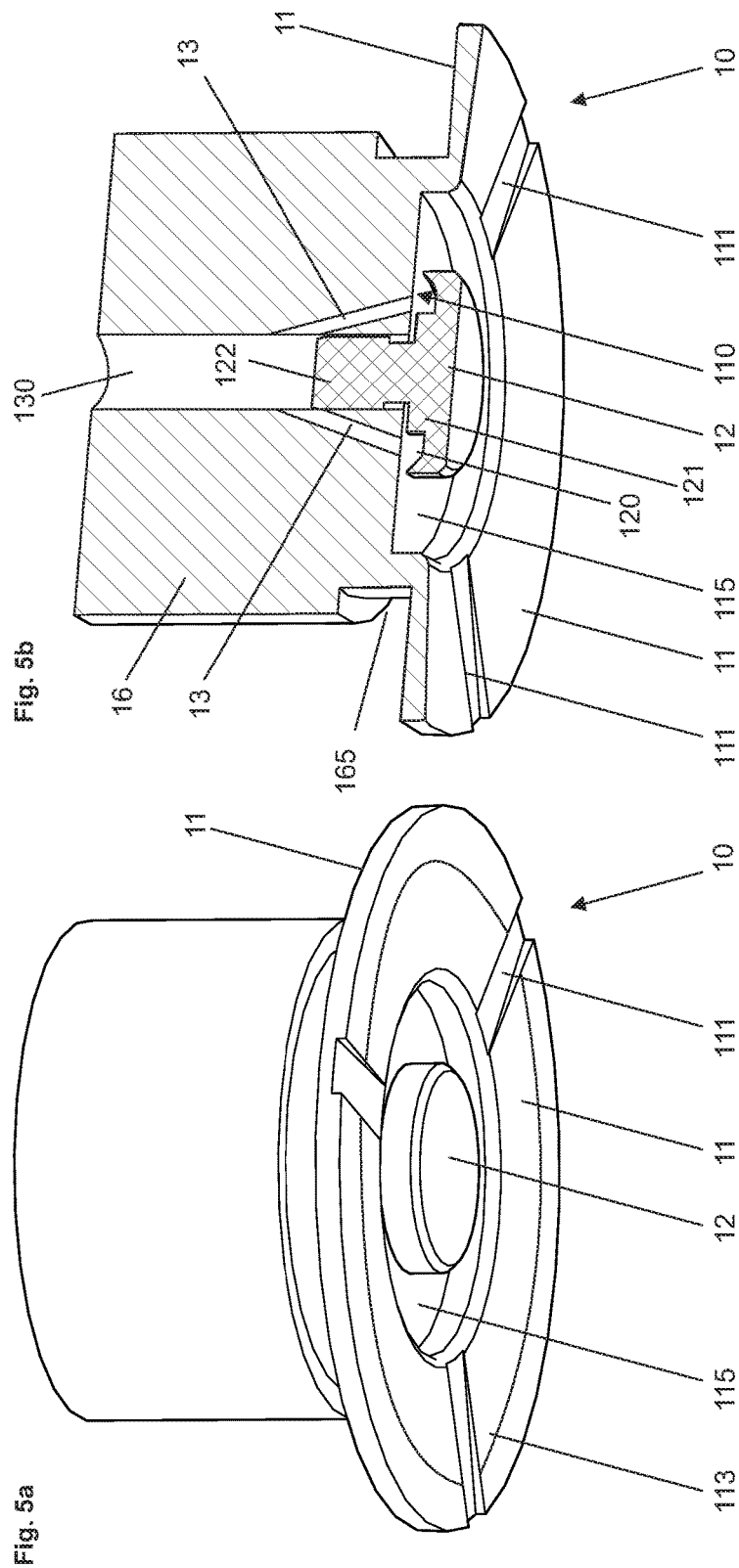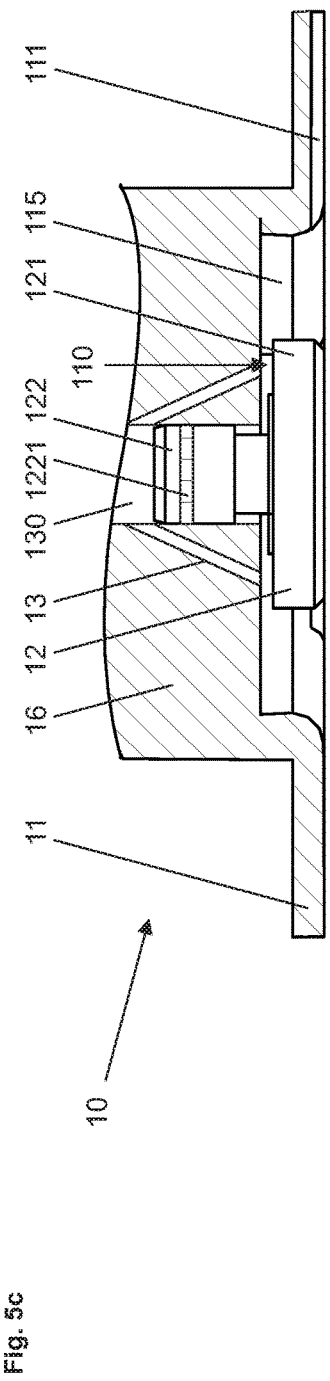

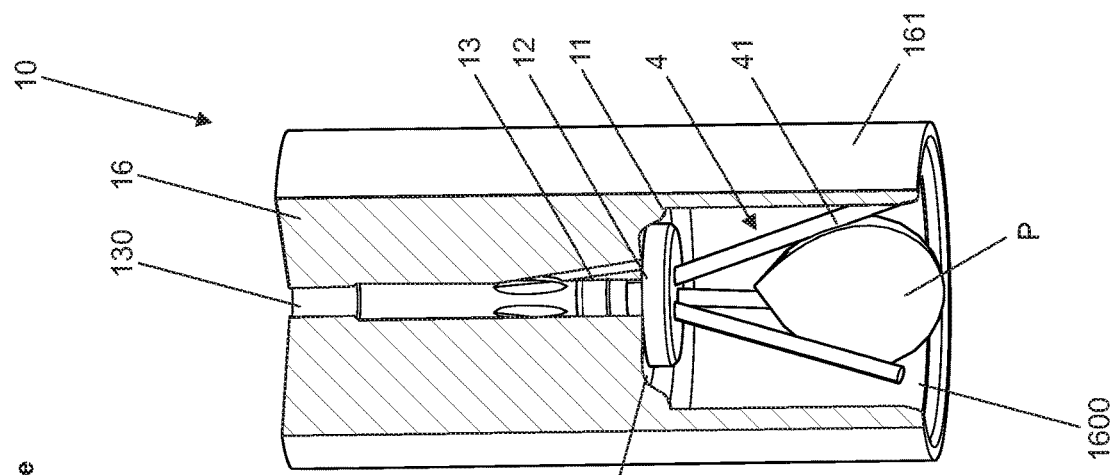
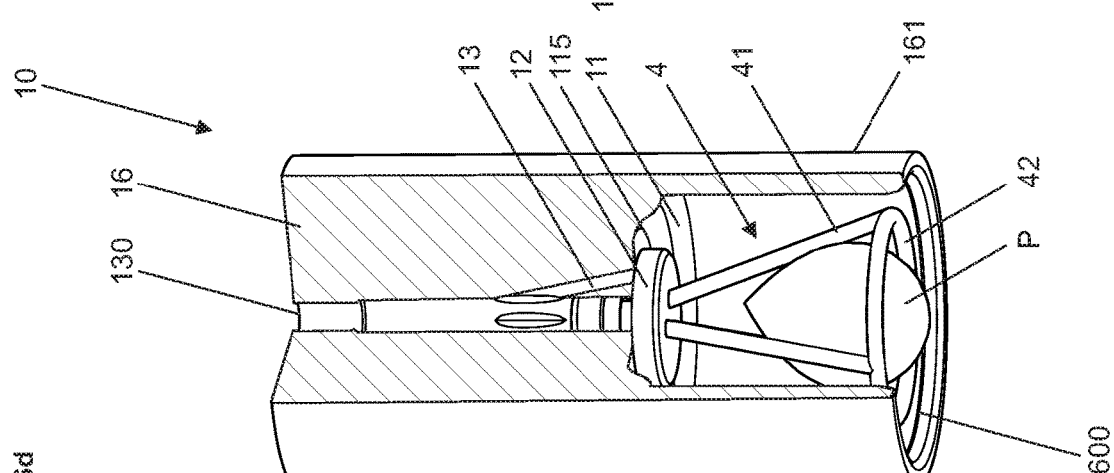
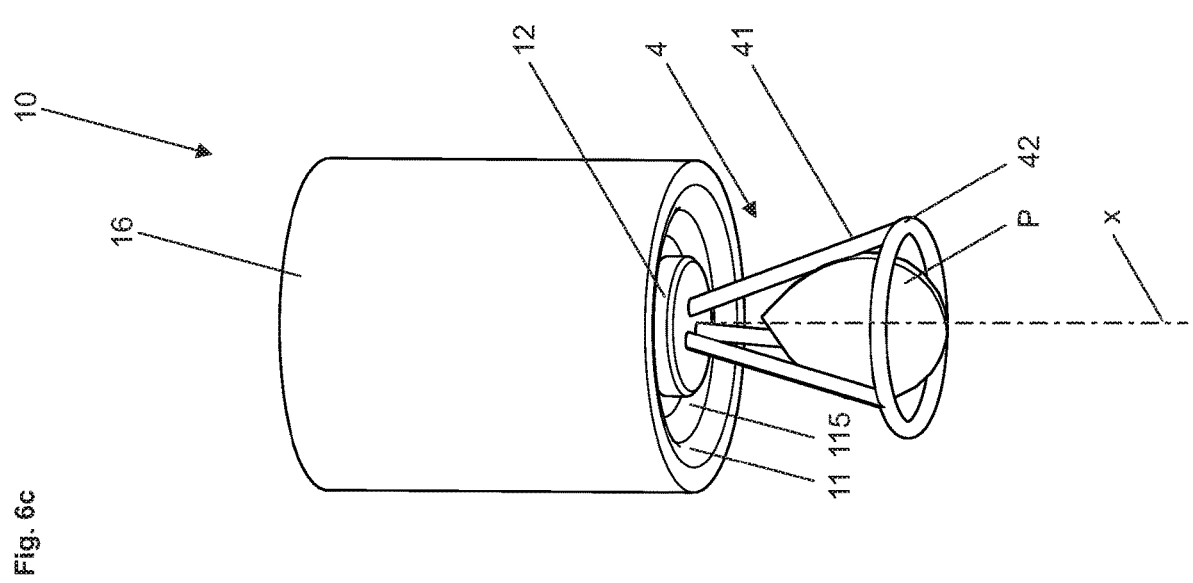

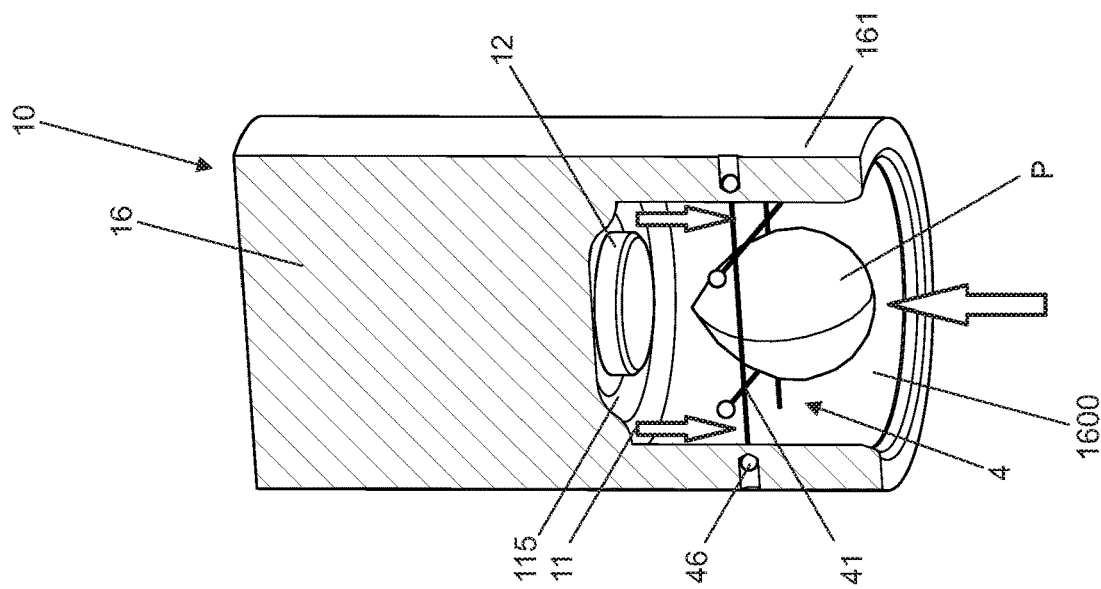
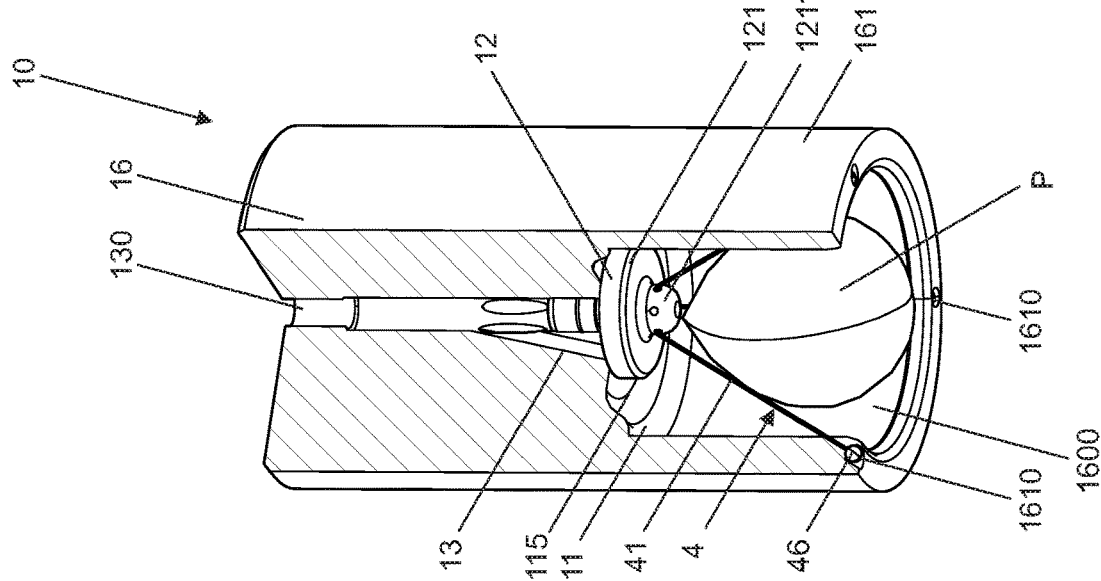
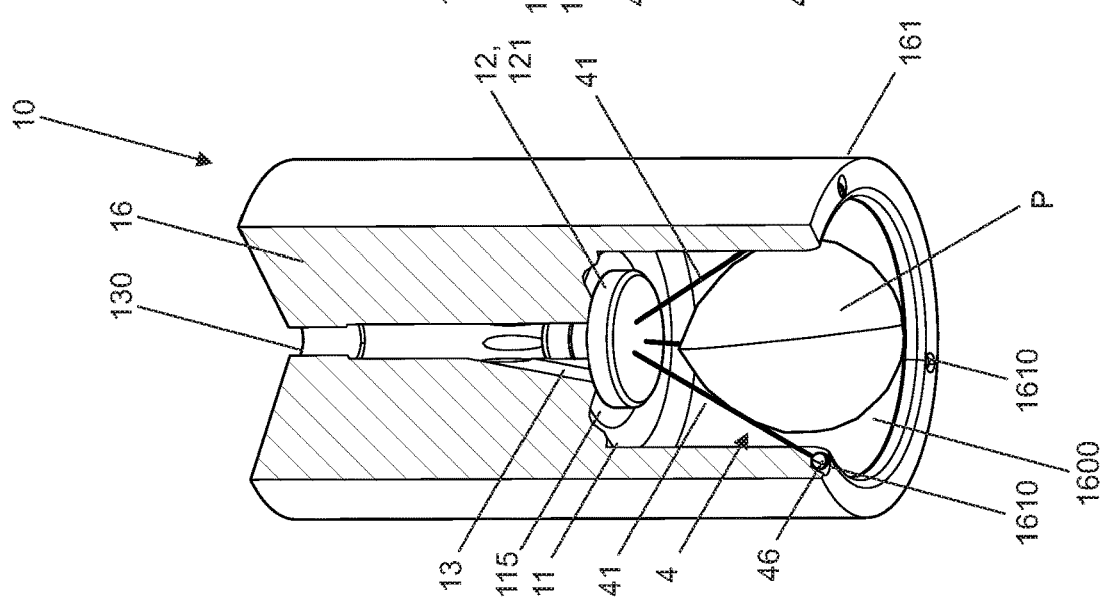

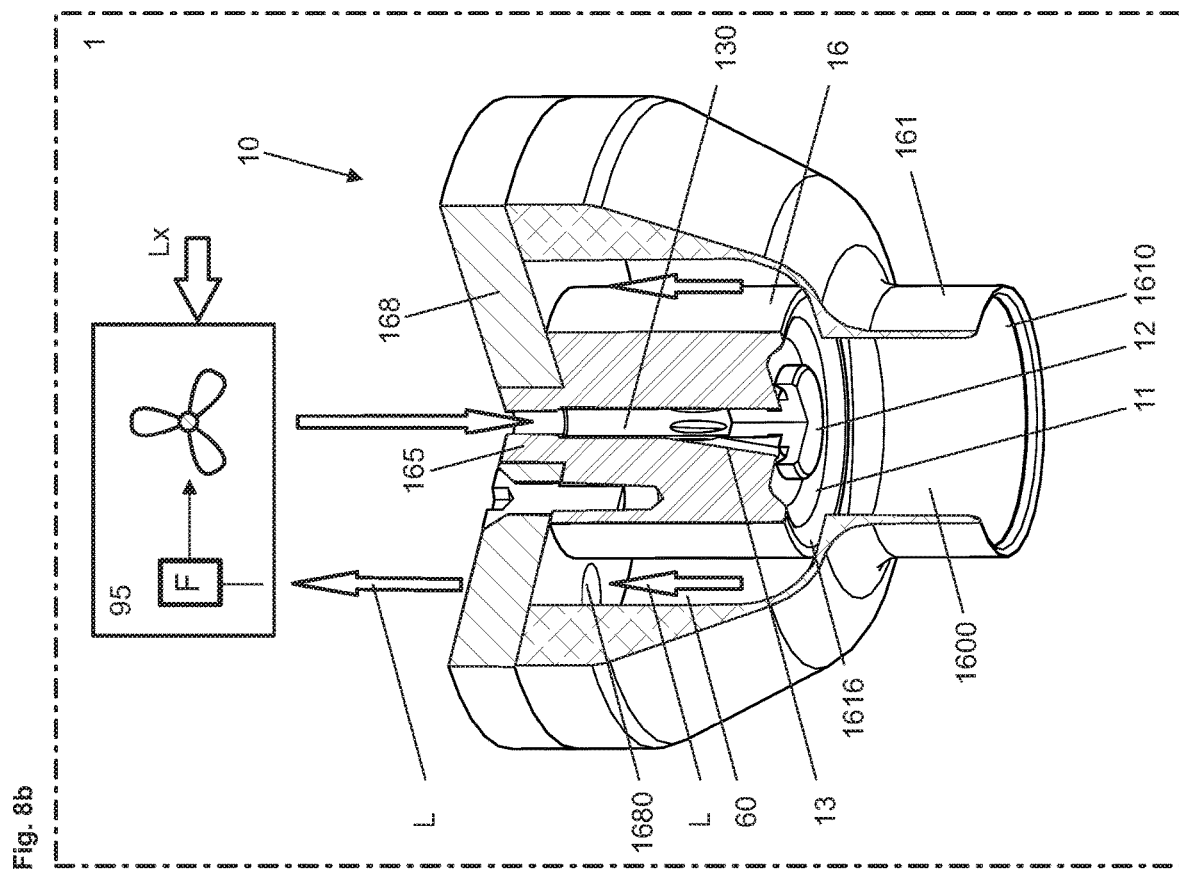

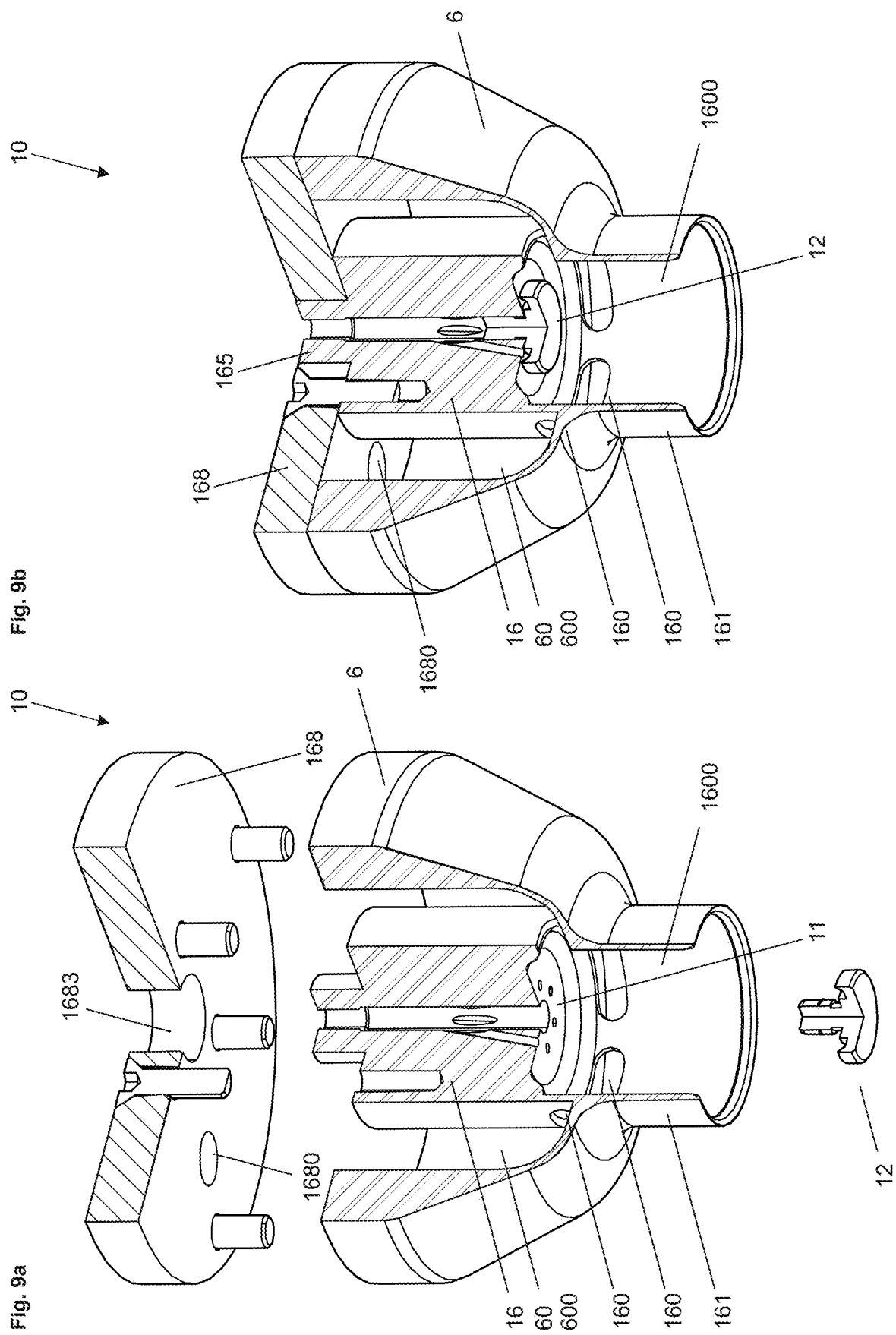

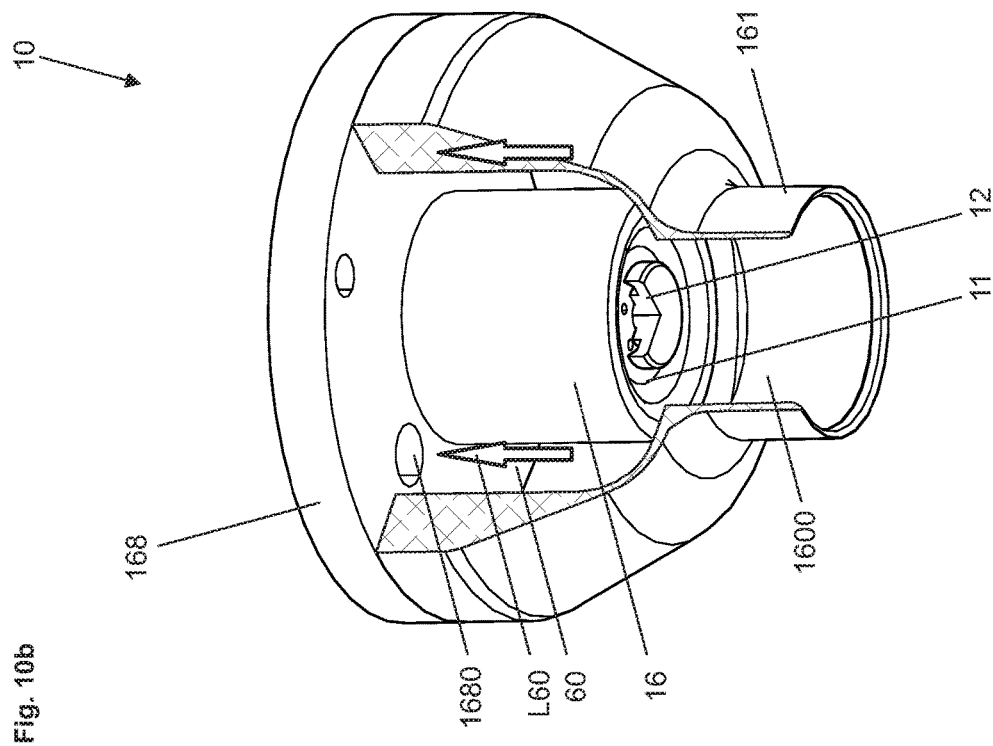
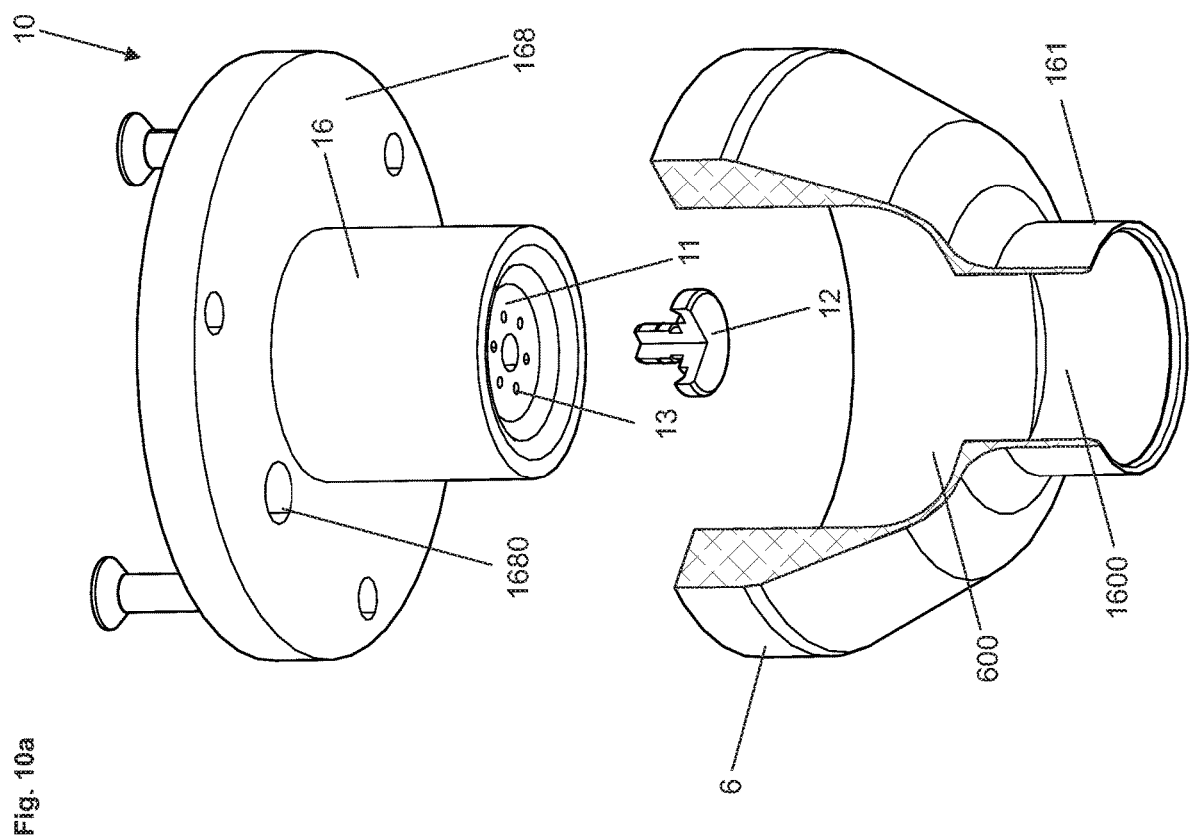
Fig. 10a
Fig. 10b

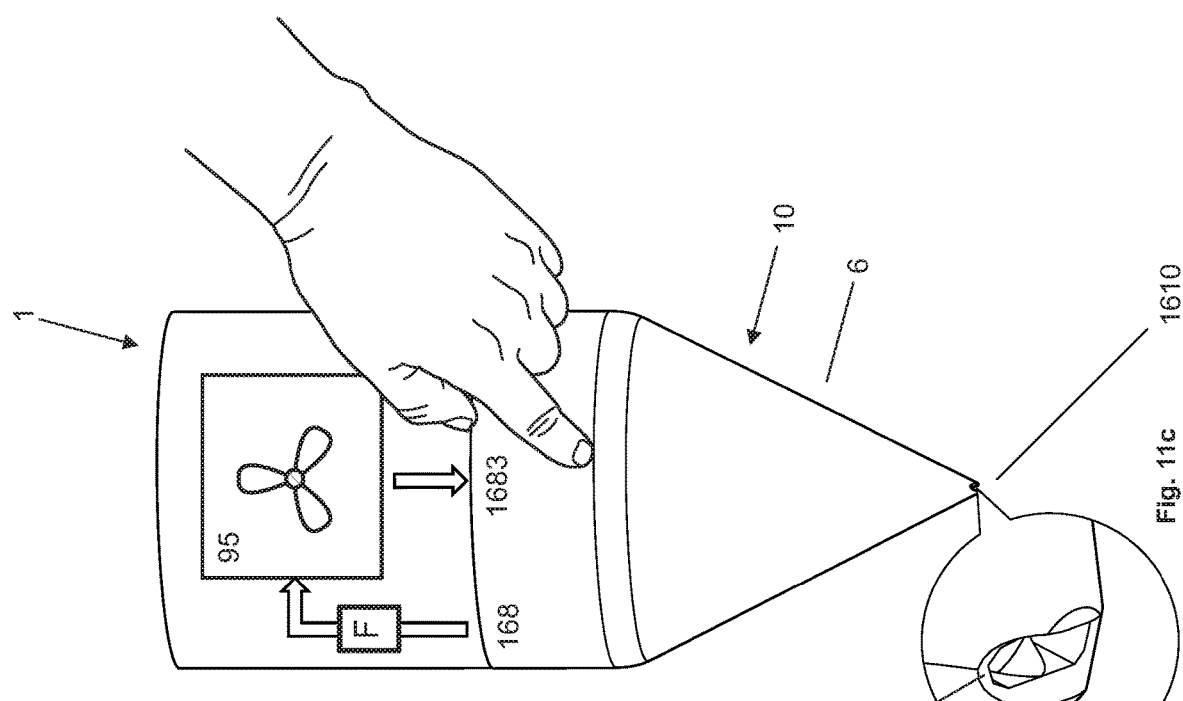
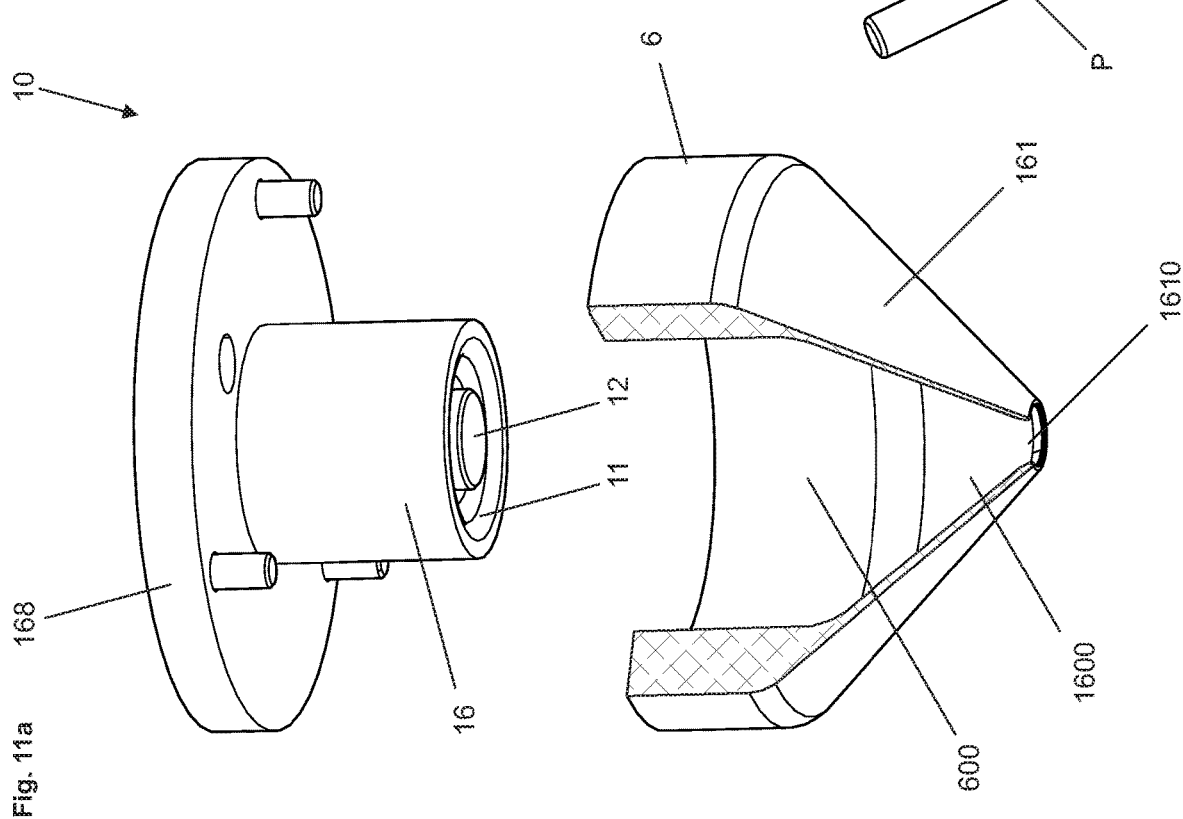

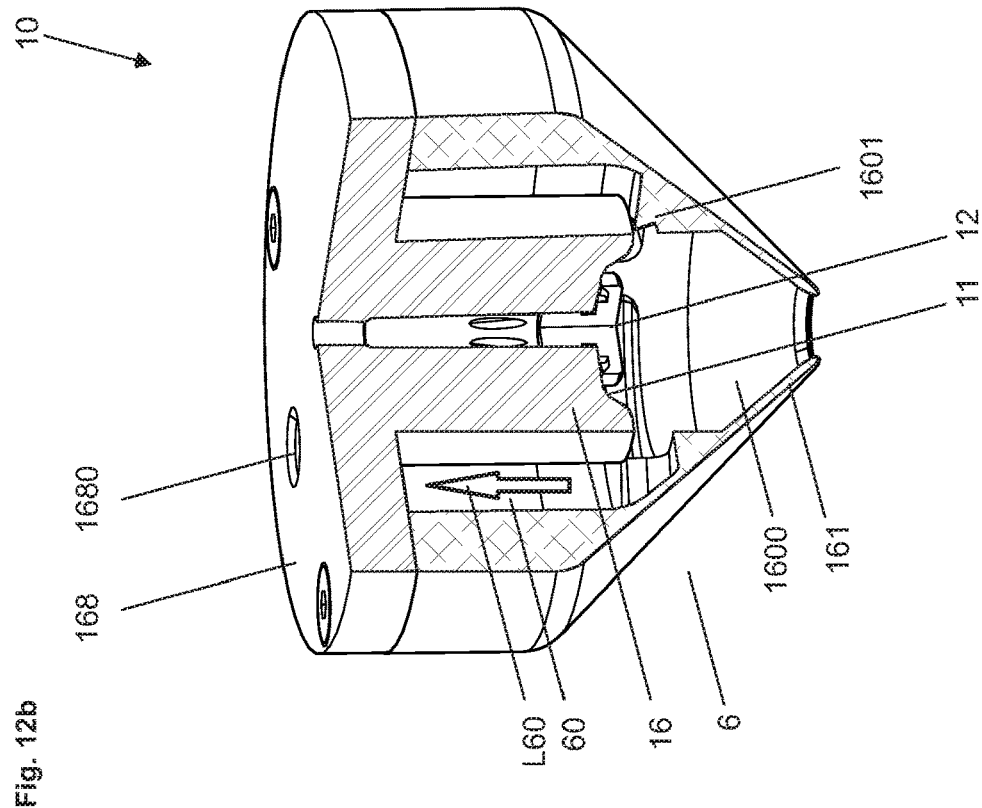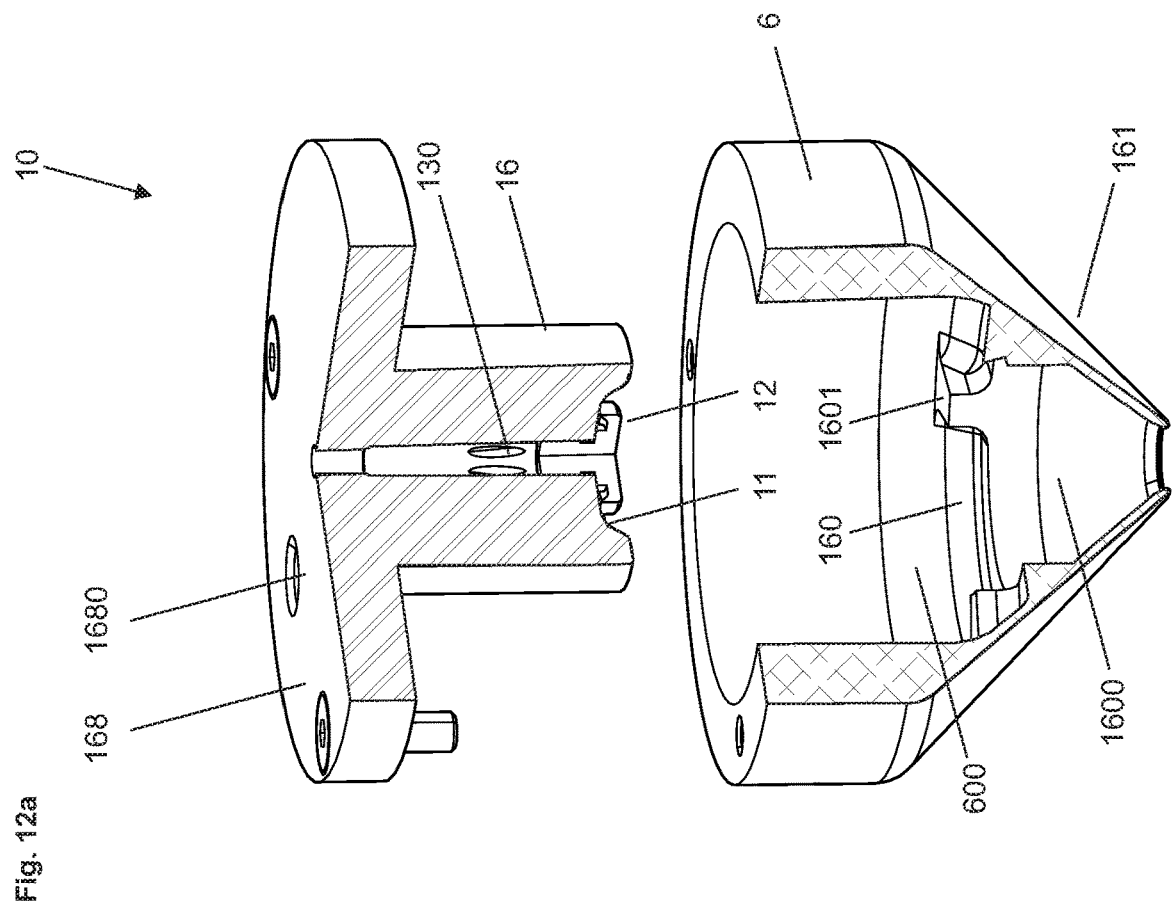

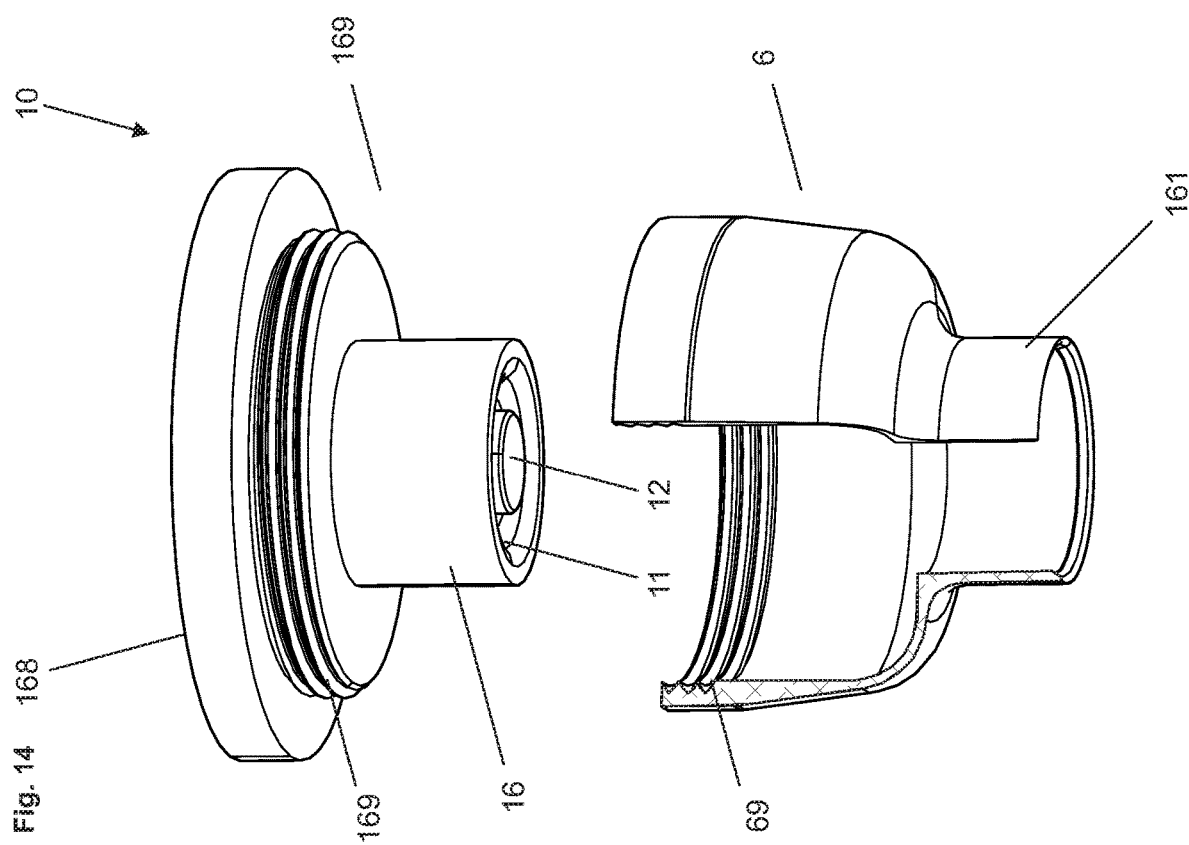
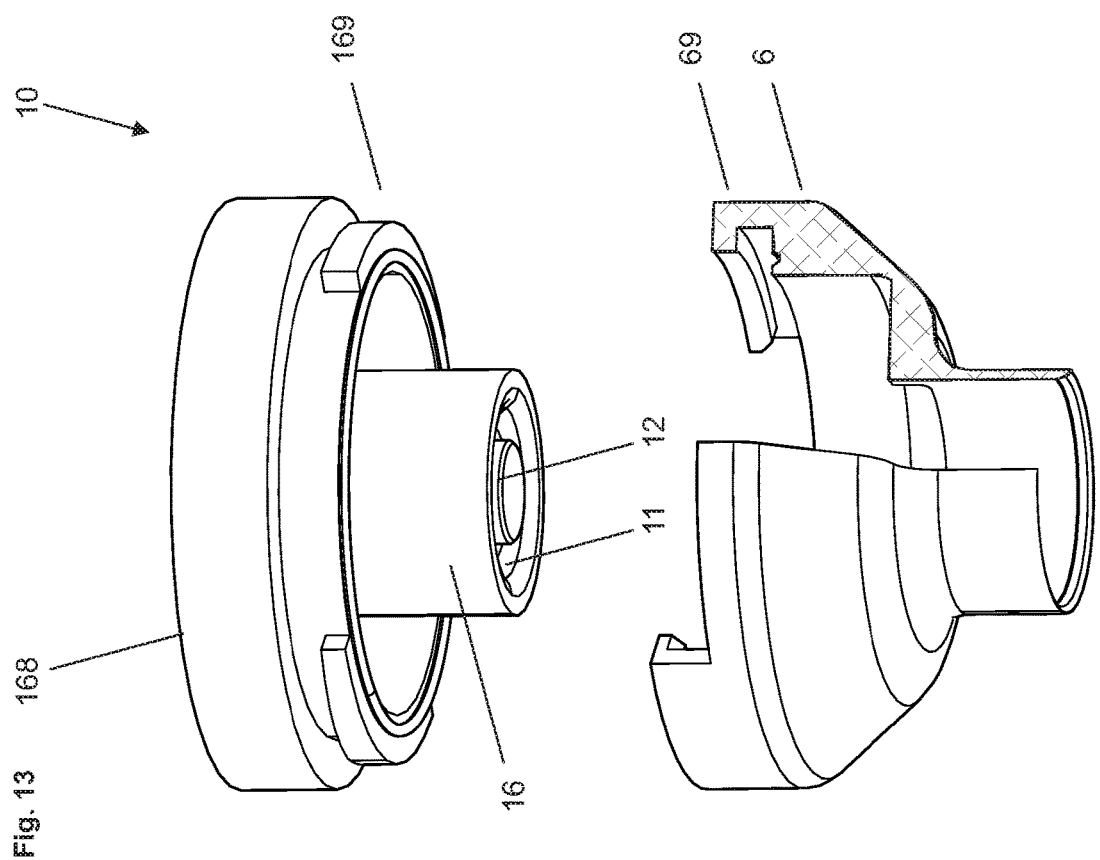

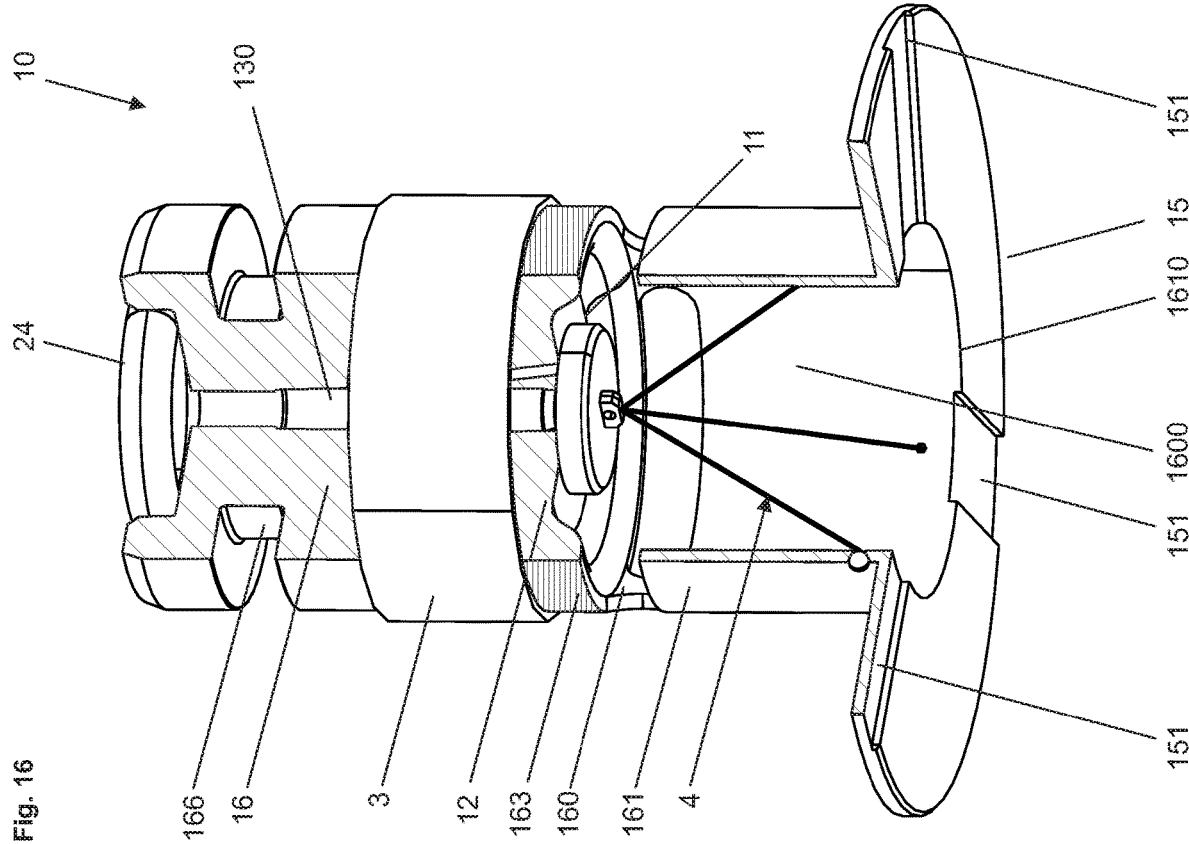
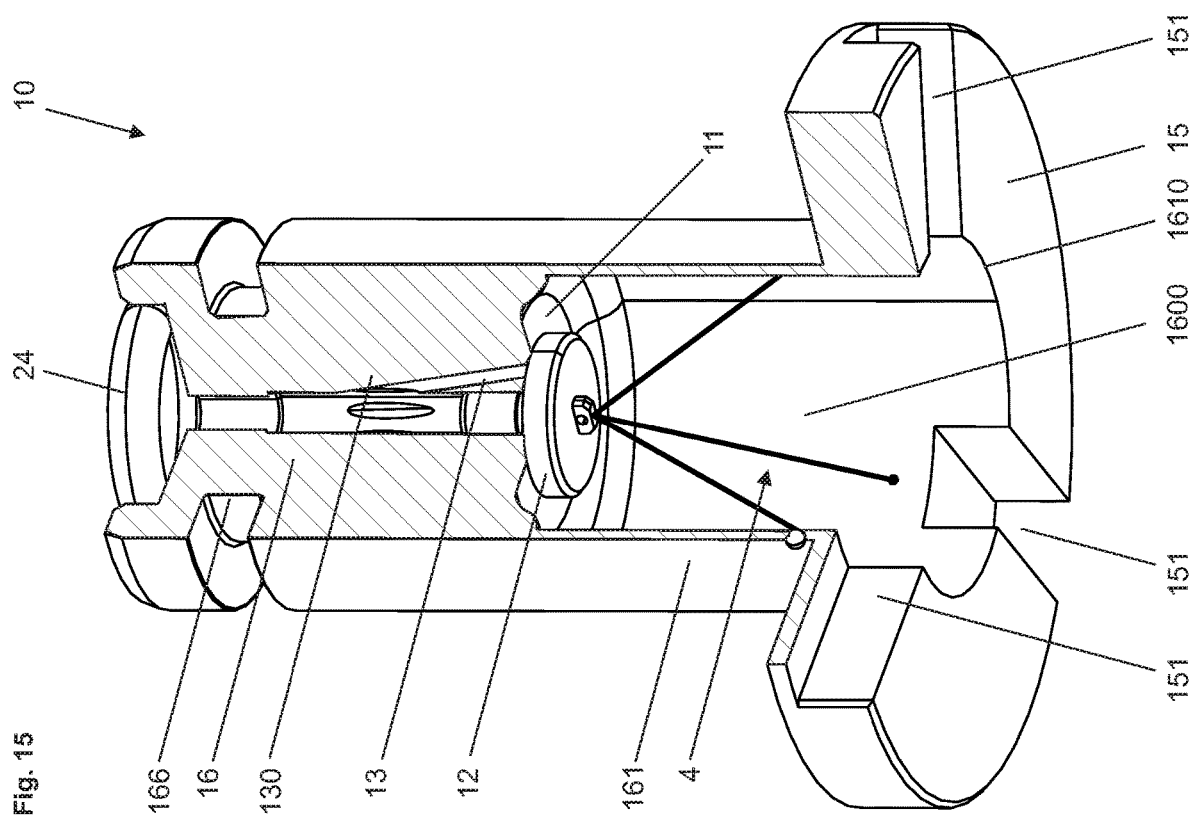

SUCTION UNIT FOR SUCTIONING AN OBJECT ACCORDING TO BERNOULLI'S PRINCIPLE AND SUCTION DEVICE INCLUDING SUCTION UNIT

The invention relates a suction unit operating according to the Bernoulli principle and a suction device with at least one such suction unit, by means of which objects, in particular isolated objects can be picked up from a working process and released again.

In numerous industrial applications, especially in the food industry, products or objects with predetermined dimensions must be provided for packaging. Food products such as bread, sausages or cheese are often divided into thin slices and packaged. In other technical areas, for example, plate-shaped workpieces such as wafers, boards, foils, paper, wood veneer and the like are produced and prepared for further processing.

The disc-shaped objects are to be picked up gently at a pick-up point and returned unchanged, i.e., without deformation, damage or contamination, at a delivery point. Instead of mechanical gripping tools, suction devices are therefore often used, which preferably work according to the Bernoulli principle. Mechanical gripping tools, on the other hand, are used for handling objects that do not have flat surfaces.

According to DE202006016833U1, Bernoulli suction units usually consist of an axially symmetrical base body through which a gaseous medium (compressed air, inert gas, etc.) flows from at least one nozzle in the direction of an object to be lifted. When hitting the object, the gaseous medium between the object unit and the base body of the suction unit is deflected in a radial direction at high flow velocity. According to the Bernoulli equation, the kinetic energy and the specific pressure energy are always constant. Hence, the area of high flow velocity, a correspondingly reduced pressure results, by means of which the object is suctioned.

In order to reduce the pressure force counteracting the suction force, which is created when the media flow hits the object, in known suction units the media flow is deflected in a radial direction before hitting the object. A plate-shaped deflector unit is held in front of the incoming gas so that it is deflected radially through an annular gap and guided away laterally. The DE202006016833U1 shows suction units where the plate-shaped deflection unit is integrally connected to the base body. The production of the suction unit or the base body with the deflection unit integrated in one piece is therefore very costly.

It should also be noted that, depending on the contour and surface quality of the object unit, disturbances or turbulence can occur in the air flow, which can increase the pressure between the suction unit and the object unit at certain points. Objects may not be held securely and may partially detach from the suction unit. This leads to problems especially when objects are to be transported and deposited piece by piece with high cycle rates and interventions to correct incorrectly deposited objects are not possible.

It was also found that the use of commercially available Bernoulli suction units poses few problems for relatively rigid, light, panel-shaped objects. Unstable objects, on the other hand, are at risk of either being damaged or not being handled in a process-stable manner. If objects are not dimensionally stable as a result of the forces acting on them and can be made to vibrate, for example, their contours change continuously and, as a result, the flow and the forces acting on the object change. Depending on the damping properties of the overall system, thin and flexible objects in particular will show dynamic behaviour which prevents a stable handling process. According to the DE202006016833U1, a functionally reliable separation of thin, flexible objects is practically impossible with conventional Bernoulli suction units. To solve this problem, the DE202006016833U1 is equipped with an orifice plate which separates the media flow from the object unit and channels it between the orifice plate and the body of the suction unit. The use of such an orifice also has disadvantages. On the one hand, the suction power can be reduced and on the other hand, suction units equipped with an orifice plate tend to accumulate dirt particles, which can be removed again with the appropriate effort.

According to the DE202006016833U1, even the handling of flat objects can cause difficulties, which is why other gripping or holding devices have been used until now for the handling of non-flat objects.

It should also be noted that with known suction units the release of the held objects is not precise. To dispense an object unit, the media flow is interrupted, whereby the suction force is reduced relatively slowly, and the object is released more or less quickly. In addition, the objects are deposited at the delivery point by gravity. This means that the delivery is not precise in terms of time and, if necessary, location. Due to the delayed delivery of the transported objects, the cycle frequencies with which the objects are transported are also limited accordingly.

It should also be noted that when objects are discharged by removing the suction force, typically the periphery of the held object unit is first released and detached from the suction unit by the force of gravity. With flexible objects, this can lead to bending or even rolling of the object unit. To enable controlled delivery, the suction unit must be aligned accordingly at the delivery point before the suction is released. To avoid this problem, the suction unit is aligned horizontally and brought close to the delivery point, but this results in significant restrictions in the handling of the objects. To achieve an orderly delivery of objects, machines and robots are therefore required that can perform complex movements. The processes for handling the objects must be adapted accordingly or restricted to these types of handling.

As mentioned, conventional Bernoulli suction units are only used for plate-shaped objects where flat contact is possible. For other objects, mechanical gripping tools are usually used, but they regularly damage the objects.

In particular, it is hardly possible to pick up of very fine, possibly elongated, thin objects. In the field of surgery, therefore, conventional suction units are hardly suitable for manipulating objects, while impacts on the treated tissue must be avoided.

It should also be noted that the gaseous medium ejected by the suction units can cause turbulence in the surrounding area, which can have a disturbing effect on valuable or sensitive material. Powdery material in particular can be swirled and repelled.

In addition, dust particles can be sucked in, which contaminate the suction unit and require maintenance work.

Another disadvantage of known suction units is that they require high air pressure to operate, which means that powerful pumps must be provided.

The present invention is therefore based on the object of creating an improved suction unit which works according to the Bernoulli principle. Furthermore, an improved suction device with at least one such suction unit is to be created.

It should be possible to implement the suction units with a simpler basic body. It should be possible to dispense with an e.g., plate-shaped deflector unit.

Inventive suction units shall allow picking up and in any controlled manner discharging objects, in particular individual product units, with any dimensions and any composition. Damage or disturbing deformation of the manipulated objects shall be avoided.

In particular, it shall be possible to pick-up flexible and soft objects and deliver them in a controlled manner. Furthermore, objects that are not flat or disc-shaped should be reliably picked-up and delivered.

Problems with a punctual detachment of the objects from the suction unit shall be avoided. It is also preferable to avoid lateral displacement of the sucked object so that it can be transported and discharged in the same position each time.

It shall be possible to pick up separated objects correctly at a pick-up point and deliver them to a delivery point with high cycle rates.

Disturbing effects on the manipulated objects and their surroundings caused by the gaseous medium used shall be avoided. Contamination of the suction units shall also be avoided. The suction units shall therefore also be advantageously applicable in difficult environments, especially in surgery, where high demands are imposed on the instruments.

It shall be possible to clean and maintain the suction units easily and thoroughly.

The suction units shall be able to operate with high efficiency, so that only a minimum air pressure is required for their operation and simply designed compressed air devices can be used.

This task is solved with a suction unit and a suction device, which has the features mentioned in claim 1 or 13. Advantageous designs of the invention are defined in further claims.

The suction unit, which serves for suctioning an object according to Bernoulli's principle, comprises a suction body with an adjoining suction plate, which adjoining suction plate has a front side facing away from the suction body, and comprises at least one entry channel, through which a gaseous medium is introducible through the suction body to the front side of the suction plate into a deflection channel, which deflection channel is delimited on one side by the front side of the suction plate and on another side by a deflection head of a deflection unit or which deflection channel is delimited on one side by the front side of the suction plate and on another side by the object when the object is suctioned, and through which deflection channel the gaseous medium is guidable to the outside.

According to the invention the suction plate has in the center a deflection chamber, which is adjoined on one side by the at least one entry channel and on another side by a plurality of suction channels which are sunk into the suction plate and extend towards the edge of the suction plate.

By means of the suction channels, which are closed off on one side by a suctioned object, the gaseous medium can flow almost laminarly from the deflection chamber to the outside, resulting in a reliable and undisturbed flow in the suction channels and a correspondingly reduced pressure. By arranging suction channels or ensuring a largely undisturbed flow of medium in the suction channels, various advantages result.

Since the suction channels are always kept free, a high medium flow is already ensured at relatively low pressure. High air pressure is therefore not required to achieve the suction effect, which is why a conventional fan can also be used as a means of conveying the gaseous medium instead of a compressed air unit.

By means of the suction channels, a lateral media flow is always ensured when approaching the object to be picked up. The arrangement of a deflection unit, which ensures a high media flow and a corresponding pressure reduction regardless of the presence of a product inside the deflection chamber, for example inside an annular gap, is thus unnecessary.

A deflection unit with a deflection head is only used as an option if a vacuum is desired in the deflection chamber regardless of the approach to an object to be sucked in. The deflection unit can be integrally connected to the suction body or can be inserted into it. For example, a mounting channel is provided in which a mounting element of a deflection unit can be anchored, for example pressed or screwed in. In this case, the user can optionally retrofit the suction units with a deflection unit. Preferably, a mounting channel is provided which connects to an inlet channel for the gaseous medium, which inlet channel is closed off by the mounting element of the deflection unit. Above the mounting element, the entry channels branch within the inlet channel, of which preferably six entry channels are provided. The inlet channel can also be divided into two parts, which are separated from each other by a part of the suction body.

The deflection head, which is preferably axially symmetrical, has a circumferential groove-shaped depression on the side facing the suction plate, which preferably runs rounded towards the edge of the deflection head. In this embodiment, the axially symmetrical deflection unit has an at least approximately anchor-shaped cross section in a longitudinal section through the axis of rotation. The media flow is thus introduced into the deflection channel through the deflection head in a controlled manner.

An sucked-in object is reliably pulled along the suction channels against the suction plate and fixed in place, regardless of the surface properties of the object. After the object has been held in the suction channels by means of the vacuum, the further media flow that runs outside the suction channels between the suction plate and the suctioned object can unfold its effect undisturbed, so that the object is reliably suctioned over the entire surface. This prevents flexible flat objects from being only partially gripped and from becoming detached again.

Preferably, several suction channels are provided, preferably evenly spaced from each other, which run radially, with the same inclination or along a curve, sunk into the suction plate to the outside. An optimum result is normally achieved with three suction channels. By means of the three suction channels, the object is reliably fixed, after which the media flow running outside the suction channels can develop its effect. Outside the suction channels, the object is only separated from the suction plate by a thin film of the moving medium, which is why a high suction force is developed there.

The cross-section of the suction channels can be constant over the entire length of the suction channels. The cross-section of the suction channels can also increase or decrease from the inside to the outside, for example by a factor that is preferably in the range of 2-10. The channel height or the channel depth can vary or be constant. The channel height adjacent to the deflection chamber can also correspond to the height of the deflection chamber, so that the transition from the deflection chamber to the suction channels is stepless. Preferably, the width of the suction channels is constant. By changing the channel cross-section, the suction channels have only a small channel cross-section on the side facing the deflection chamber, which prevents the media flow from being diverted mainly through the suction channels. As a result, the channel cross-section increases, allowing the medium to flow unhindered and develop its effect. By changing the channel cross-section, the course and the design of the suction channels, the media flow and the suction pressure can be adapted to the manipulated objects.

In a further preferred embodiment, several, preferably six, entry channels are provided, which are preferably arranged at equal distances from one another and preferably enter the deflection chamber. Preferably, one of the entry channels each faces a suction channel so that the flow through the suction channel can be established more easily.

The entry channels are preferably inclined outwards towards the suction plate, for example like the edges of a pyramid, and move steadily away from the central axis until they reach the front of the suction plate. In this way, the media flow is already deflected. In addition, the entry channels are relatively easy to clean in the event of contamination. In principle, the entry channels can also run outward along a curve. For example, straight tubes or tubes running along a curve can be embedded in the suction body to create entry channels of any shape.

The inclined arrangement of the entry channels or the partial deflection of the gaseous medium already inside the suction body allows the suction unit to be operated at reduced pressure, which is why a conventional fan can also be used as a means of conveying the gaseous medium instead of a compressed air unit. The pressure requirement can be further reduced by a higher number of preferably evenly distributed entry channels.

In another preferred embodiment, a plurality of outlet channels extends through the suction body to outlet openings. The outlet openings are located inside the suction channels or outside the suction channels or inside and outside the suction channels. When the objects are discharged, the media flow through the entry channels is interrupted so that the suction effect is reduced, and the object is released from the suction unit. To accelerate this process, a media flow is delivered through the outlet channels, which pushes the object away from the suction plate. The dispensing process can therefore be shortened to an extremely short period of time in the range of milliseconds. In this way, the delivery can occur in a controlled manner in any position of the object without deforming it, for example folding or curling it. With uniform distribution of the outlet openings, it can thus be achieved that even very flexible objects can be ejected aligned in one plane. The controlled and rapid discharge of the objects, which can be controlled by a control unit by actuating valves by means of which the media flows are switched on or off, also makes it possible to substantially increase the cycle rate at which objects are picked up at a pick-up location and discharged again at a discharge location.

In further preferred embodiments, the suction plate is lamellar and flexible so that it can deform under the negative pressure that occurs between a suctioned object and the suction plate and adapt to the flat and possibly flexible object. Unevenness of the object can thus be compensated for by the elastic suction plate, which is deformed accordingly.

The suction plate can be connected in one piece to the suction body or is connectable to it, possibly screwable. Preferably, the suction plate is integrally connected to the suction body and separated from it by a circumferential groove. The circumferential groove (see FIG. 4) can also serve to hold the suction unit within a receiving chamber by means of a locking part (see FIG. 2e).

In preferred embodiments, a plurality of deflection chambers with or without deflection heads may also be provided, at least one of which has associated therewith three or more suction channels which are recessed into the suction plate in a straight line or along a curve.

Preferably, a plurality of deflection chambers, at least one of which is assigned a deflection head, and a plurality of suction channels are provided. The suction channels are assigned to at least one deflection chamber or the plurality of deflection chambers and are either recessed straight or along a curve into the suction plate. The suction channels can, for example, be connected to only one deflection chamber.

Several entry channels are preferably assigned to each deflection chamber, which are arranged at regular or irregular distances from one another, and which run inside the suction body inclined outwards towards the suction plate.

The suction body is designed as a single piece or as a modular system comprising several suction body modules.

In preferred embodiments, at least the border of the suction plate is made of an elastic material and is lamellar and flexible.

As described above, suction units of the prior art operating according to the Bernoulli principle are only used for holding flat objects. In the food industry in particular, the manipulation and gentle holding of objects, for example confectionery items, fruits and nuts or parts thereof, which do not have flat surfaces, are of particular importance. Such objects were previously gripped and manipulated with mechanical grippers. In surgery, for example, small objects such as needles and splinters often need to be grasped without interfering with the surrounding tissue. In particular, the tissue should not be contaminated. Furthermore, the penetration of impurities, such as tissue residues, dust and the like, into the suction unit should be avoided.

To solve these problems, a suction basket is provided downstream of the suction plate, if necessary, at a distance from it or separated from it by individual openings, which encloses a receiving channel into which an object can be sucked. If necessary, the suction basket is provided with wall openings which ensure a media flow even when the channel opening is closed.

The suction basket causes the gaseous medium to flow around an sucked-in object. Even if an irregularly shaped body, such as a hazelnut, is sucked in, the gaseous medium flows through it at a high flow rate, which in turn creates a vacuum that can be used to hold the object securely.

The distance along which the gaseous medium flows at high speed is very long when a suction basket is used, possibly in conjunction with the suction bell described below, which is why a vacuum is achieved over a large area and with a high effect. Even when a suction basket is used, possibly in conjunction with the suction bell, a conventional fan can be used as a means of conveying the gaseous medium instead of a compressed air unit.

Ensuring the media flow through the suction channels, the partial redirection of the media flow inside the suction body through the entry channels and, if available, the realization of a suction basket, possibly in combination with a suction bell, thus ensure the realization of a suction unit that can operate at low pressure generated, for example, by a blower or fan.

The receiving channel has a channel opening which is designed in such a way that individual objects can be inserted through it into the receiving channel or can be fixed at the edge of the channel opening.

The dimensions of the preferably transparent suction basket, in particular length and diameter, or the dimensions of the channel opening, or the channel entrance of the suction channel are preferably adapted to the objects to be transported. The suction basket can therefore have, for example, a cylindrical shape, a conical shape, a shape with a rectangular or polygonal cross-section. The suction basket can also have combinations of said shapes and for example be conically shaped only on the outlet side. The suction channel can be regular, irregular, symmetrical or asymmetrical in shape, so that objects can be grasped in any position or only in a certain position. In the food industry, it may not matter how an object is oriented. In surgery or even in semiconductor technology, on the other hand, the orientation of an object may be mandatory. The length and width of the suction basket are selected so that an object can at least partially enter the channel opening or the channel entrance. The length of the suction basket can therefore be only a few millimetres or a few centimetres. For example, the dimensions of the suction basket are adapted to food objects, such as nuts, fruits, or parts thereof. If the suction basket is detachably mounted, a suitable suction basket can be mounted in each case. A surgeon will choose a suction basket that is adapted to the corresponding work process, tissue to be picked up or tools. The channel opening or the channel entrance is preferably adapted to the dimensions of the objects to be picked up and can, for example, be stepped.

With a suction unit of this preferred design, objects of any shape can be gently grasped and transported.

The use of the suction basket also improves the efficiency of the suction unit, which can be operated at lower pressure.

The efficiency of the suction unit can be further improved with the suction body being connected or connectable to a suction bell which encloses the suction body separated by a return duct which opens on one side into the suction basket provided on the suction bell and on another side into at least one outlet opening which may be provided in the wall of the suction bell.

The medium is returned through the return channel and, if necessary, fed back to the compressed air device, resulting in an at least partially closed circuit. Since the gaseous medium in the circuit is always in motion, only a small amount of energy is required to convey it, which can be supplied by a simple blower that conveys the circulated medium to keep the media flow constant.

The circulation of the gaseous medium also improves its flow behavior. Turbulence and stall are reduced or avoided, so that an increased flow velocity and pressure can build up.

The use of the suction bell not only further increases the efficiency of the suction unit, but also provides additional advantages. The controlled recirculation of the medium prevents disruptive effects on the environment, such as turbulence of object particles or tissue particles or undesirable flows along the treated tissue during a surgical procedure. Furthermore, it is largely prevented that particles from the production process or impurities can enter the suction unit.

Preferably, a filter is provided in the suction unit, which prevents impurities from being circulated with the media flow.

The suction basket is preferably integrally connected or optionally connectable with the suction plate or the suction body and/or the suction bell. The suction basket can be screwed to the suction body, connected by an interference fit or otherwise. For example, the suction basket comprises an annular flange with an internal thread which can be placed on an external thread on the suction body.

The suction bell can be connected to the suction body or to a mounting plate, which may be connected to it, in one piece or by screws or by means of integrally formed connecting elements, such as threaded elements or elements of a bayonet lock. In this way, a quick release fastener is realized, which allows to remove the suction bell in order to clean the suction unit or to put on another suction bell adapted to the manipulated objects or with which the dimensioning of the air ducts or the circulated air flow is adapted.

Suction of objects is facilitated if they are held centrally and sucked in along the central axis of the suction unit. The suction units are therefore preferably provided with a centering device which allows a suctioned object to be guided against the central axis of the suction unit and held in a centralized manner. The centering unit may be connected to the suction body and/or to the deflection unit, if provided, and/or to the suction basket, if provided, and/or to the suction bell, if foreseen. The centering device may be made of the same material as the suction body, the suction basket, the deflection unit, or the suction bell. Furthermore, the centering device can be made of any material, such as metal and plastic.

Inventive suction devices comprise one or more inventive suction units with a suction basket and/or without a suction basket and preferably comprise a drive device, optionally a robot, by means of which the suction units can be moved between at least one pick-up location and at least one delivery location. The drive device, which is electrically, hydraulically or pneumatically driven, is preferably controllable by means of a control unit, so that the work processes in which the suction units are involved can run automatically. The control unit can be connected to sensors by means of which the work processes can be monitored, and the process steps can be correctly timed. Preferably, the processes or the objects, which are preferably held by completely or partially transparent suction units, are monitored by cameras.

In preferred embodiments, the suction device comprises at least one distribution device, which is preferably designed in the form of a cuboid, a cylinder or a cylinder segment, and which holds a plurality of suction units, which are preferably arranged uniformly distributed and to which compressed air can be supplied jointly via at least one distribution duct or individually via at least one pressure line.

The distribution device preferably comprises several receiving chambers, each of which is open towards the distribution channel through at least one chamber opening and in each of which receiving chambers a suction unit is arranged, which is tightly sealed against the border of the chamber opening by a sealing element, for example a sealing ring. The suction units can therefore be mounted as desired in the receiving chambers and connected to the distribution channel. Preferably, a locking element, for example in the form of a clamp, is provided, which can be inserted into the receiving chamber and positively connected to the suction body of the suction unit in such a way that the suction unit is pressed against the sealing element. By removing or pulling out the locking element, each of the suction units can be easily removed, cleaned and reinserted.

In preferred embodiments, it is provided that a gaseous medium can optionally be introduced into the entry channels of the suction units via a first distribution channel or a first pressure line respectively.

In further preferred embodiments, the gaseous medium can additionally be introduced into the outlet channels of the suction units optionally via a second distribution channel or a second pressure line respectively.

By means of the control unit, valves can be controlled in such a way that the gaseous medium is selectively introduced into the entry channels and/or into the outlet channels at the desired time intervals. Preferably, a control program is provided in the control unit which can control the drive device with which the suction units are moved and the media flows by means of which objects are coupled to or decoupled from the suction units.

The suction body, the suction plate, if present the suction basket, which are preferably connected to each other in one piece, and/or the deflection unit are preferably made of an elastic or transparent material or of an elastic and transparent material, such as acrylic. By using the transparent material, the objects sucked in by the suction units remain visible and can be monitored by a camera with regard to their condition, their dimensions and their orientation. Image data from the camera are evaluated, for example in the control unit, and if necessary, compared with patterns so that defective objects can be sorted out. For example, defective objects are transported further and dropped at a collection point by removing the suction pressure and/or ejected by means of compressed air.

The suction body and/or the deflection unit, if provided, and/or the suction basket, if provided, and/or the suction bell, if provided, can be made of the same or different materials, such as metal or plastic. For example, the suction body may be made of plastic and may be connected or connectable to a suction basket or suction bell made of plastic or metal.

Figure 2A:
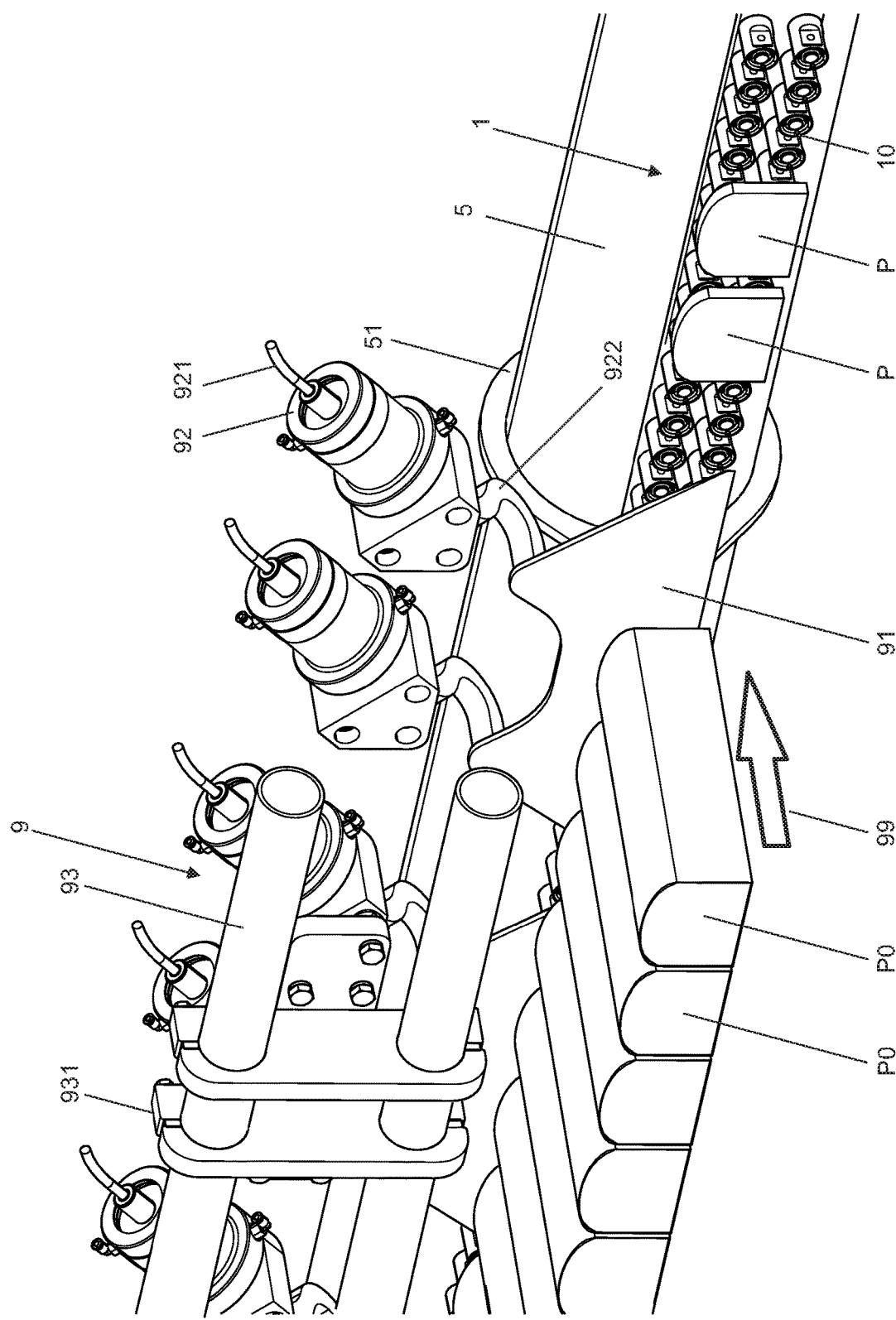
Figure 4:
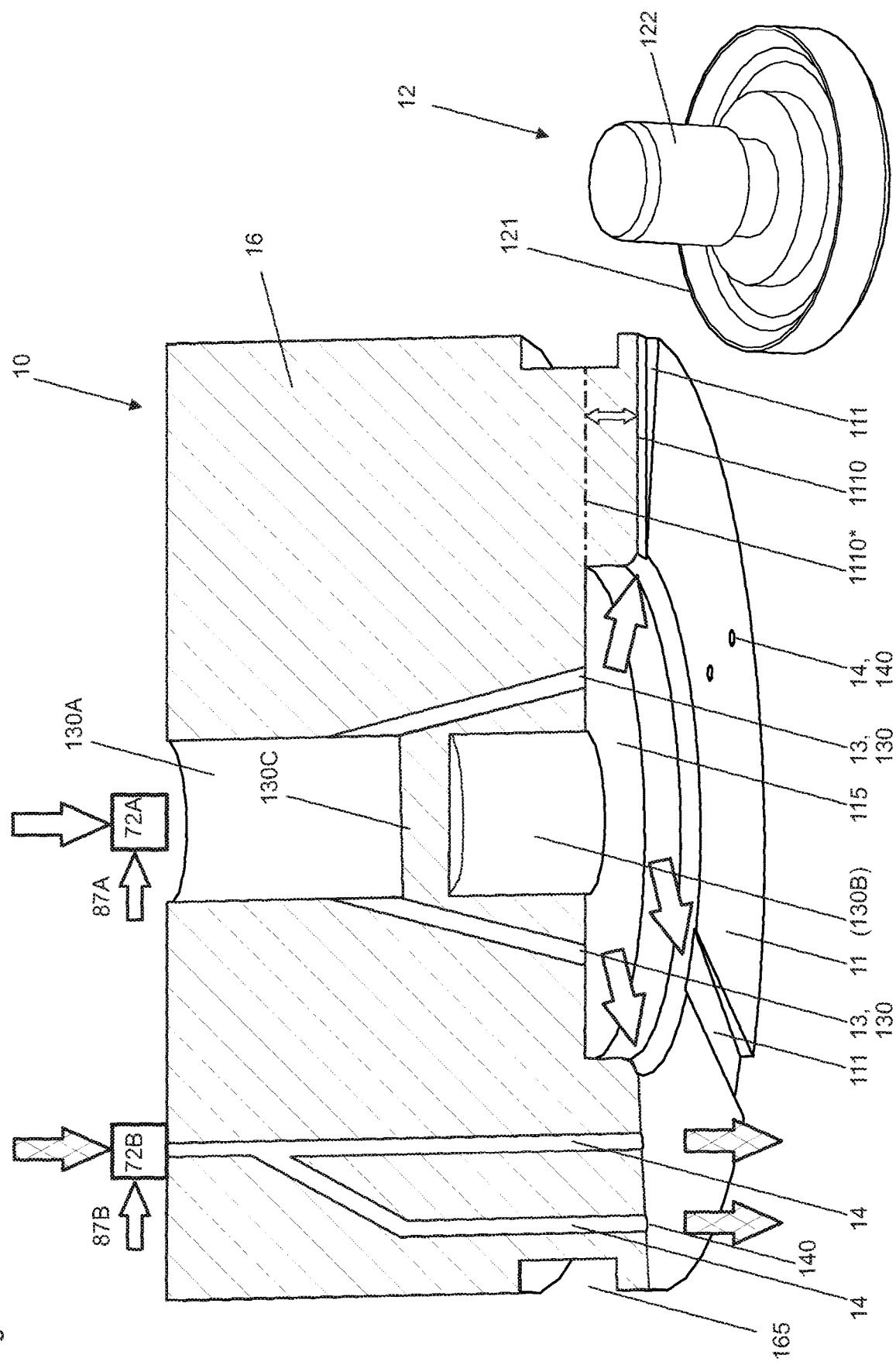
Figure 6B:
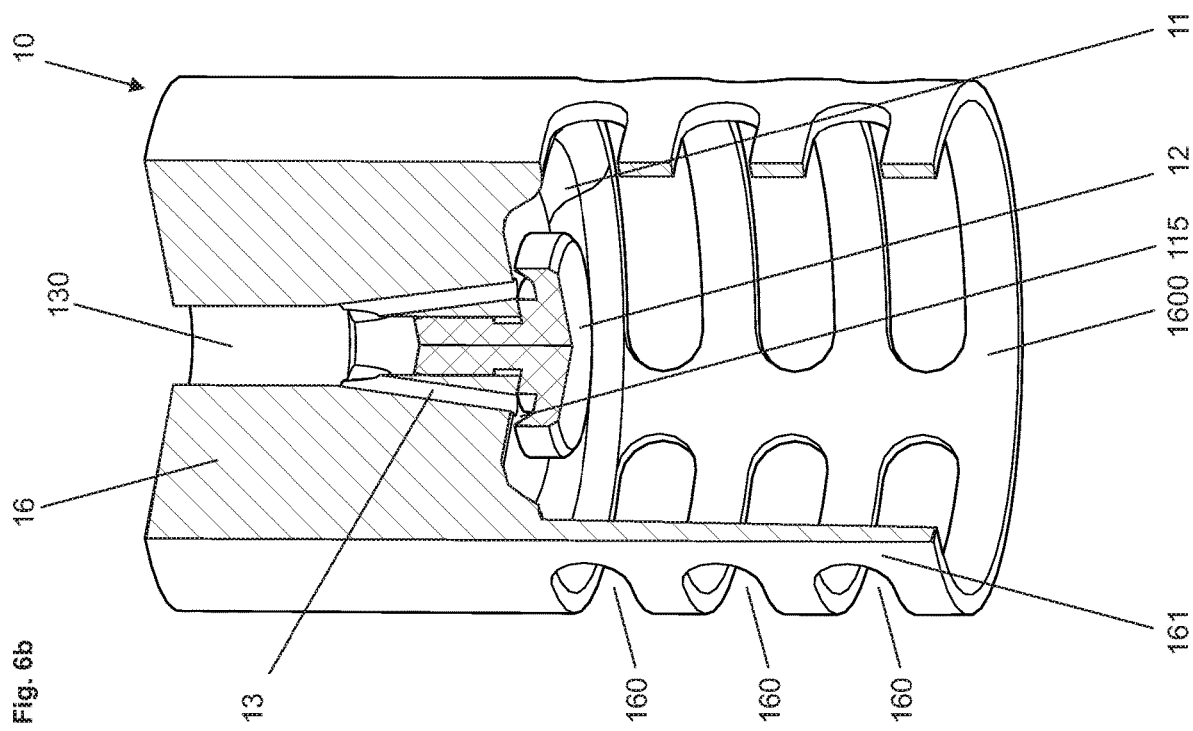
Figure 6A:
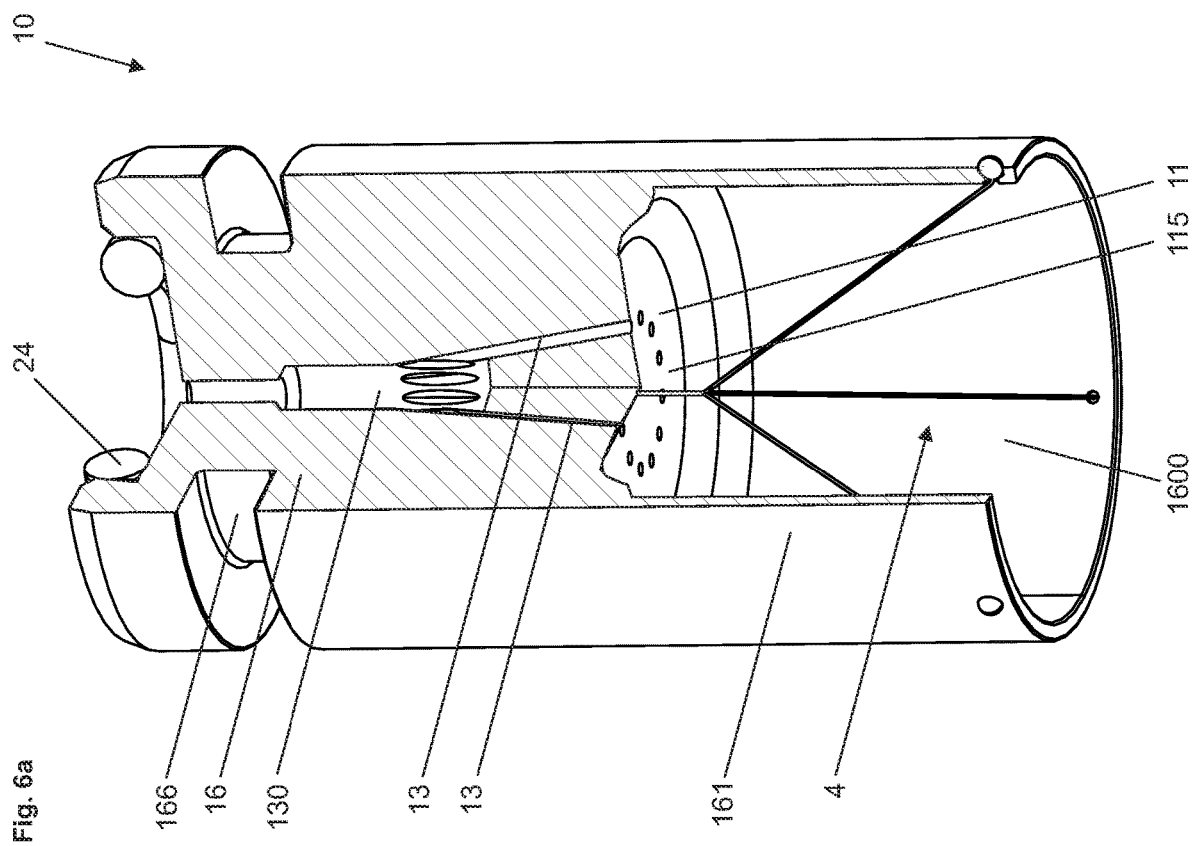
Figure 6J:
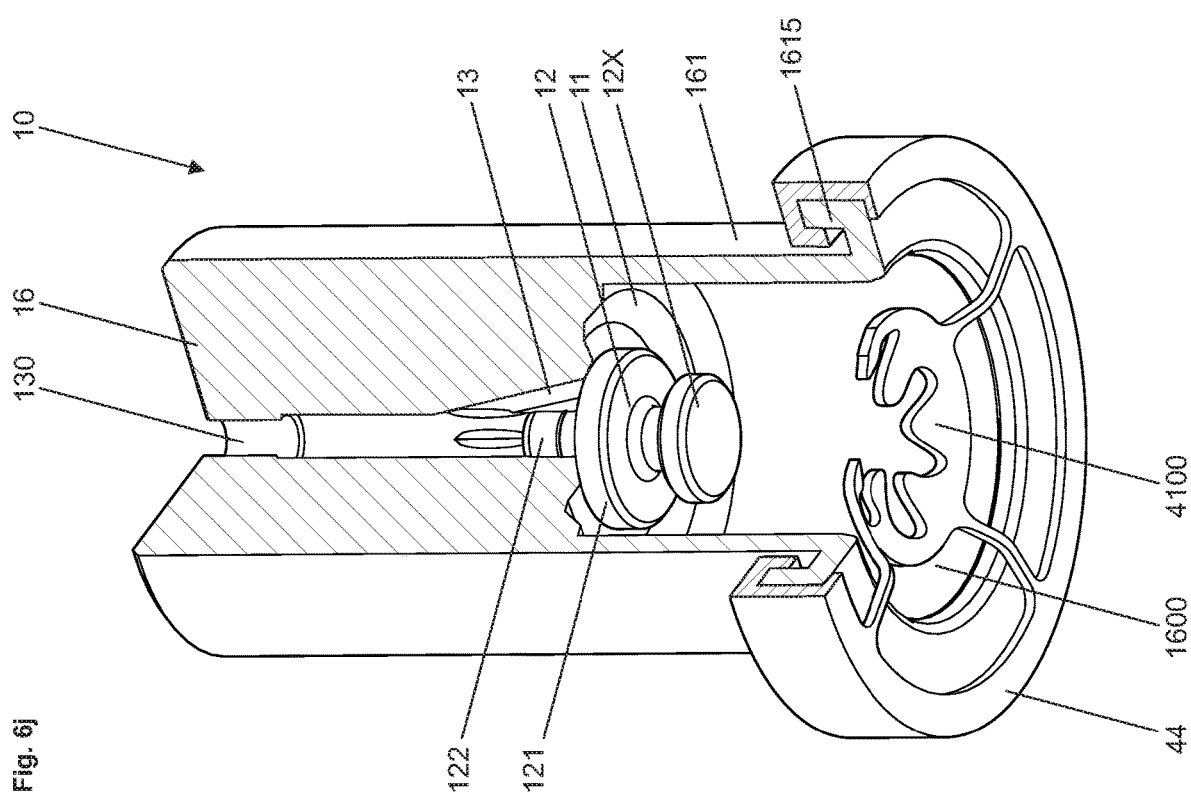
Figure 6I:
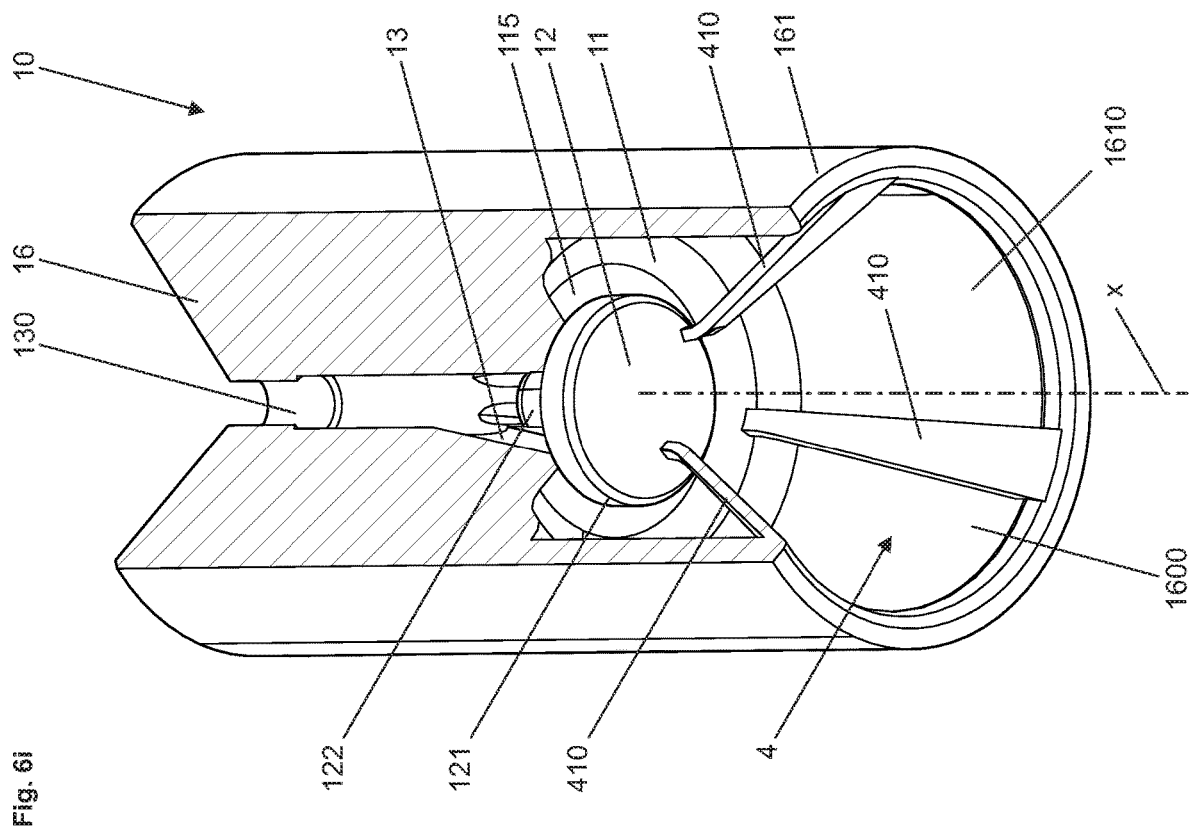
Figure 6I:
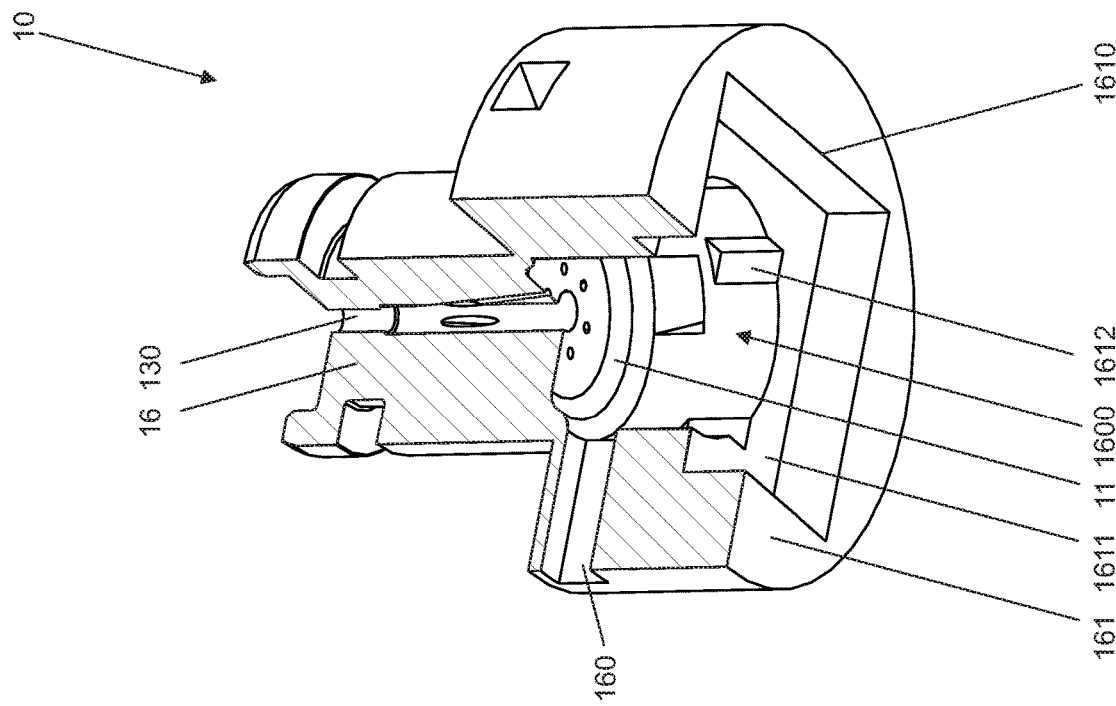
Figure 6K:
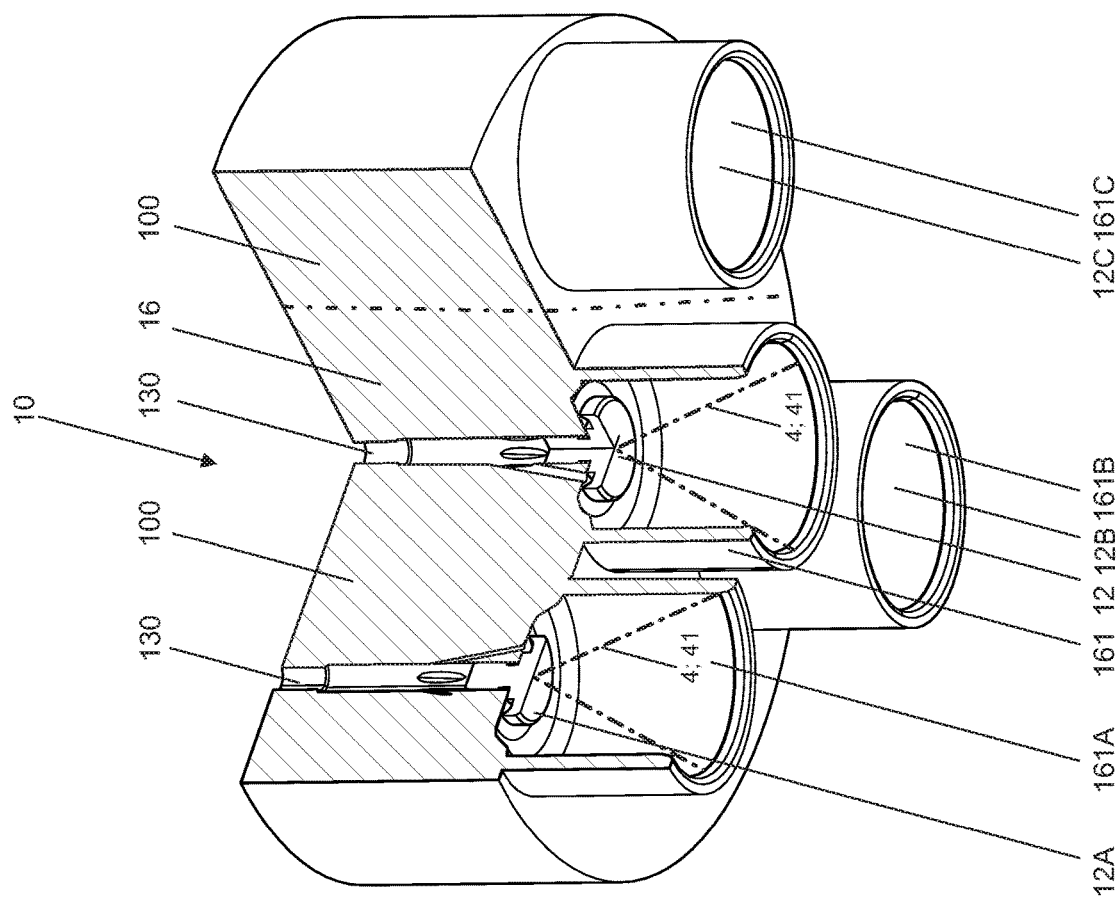
Figure 7A:
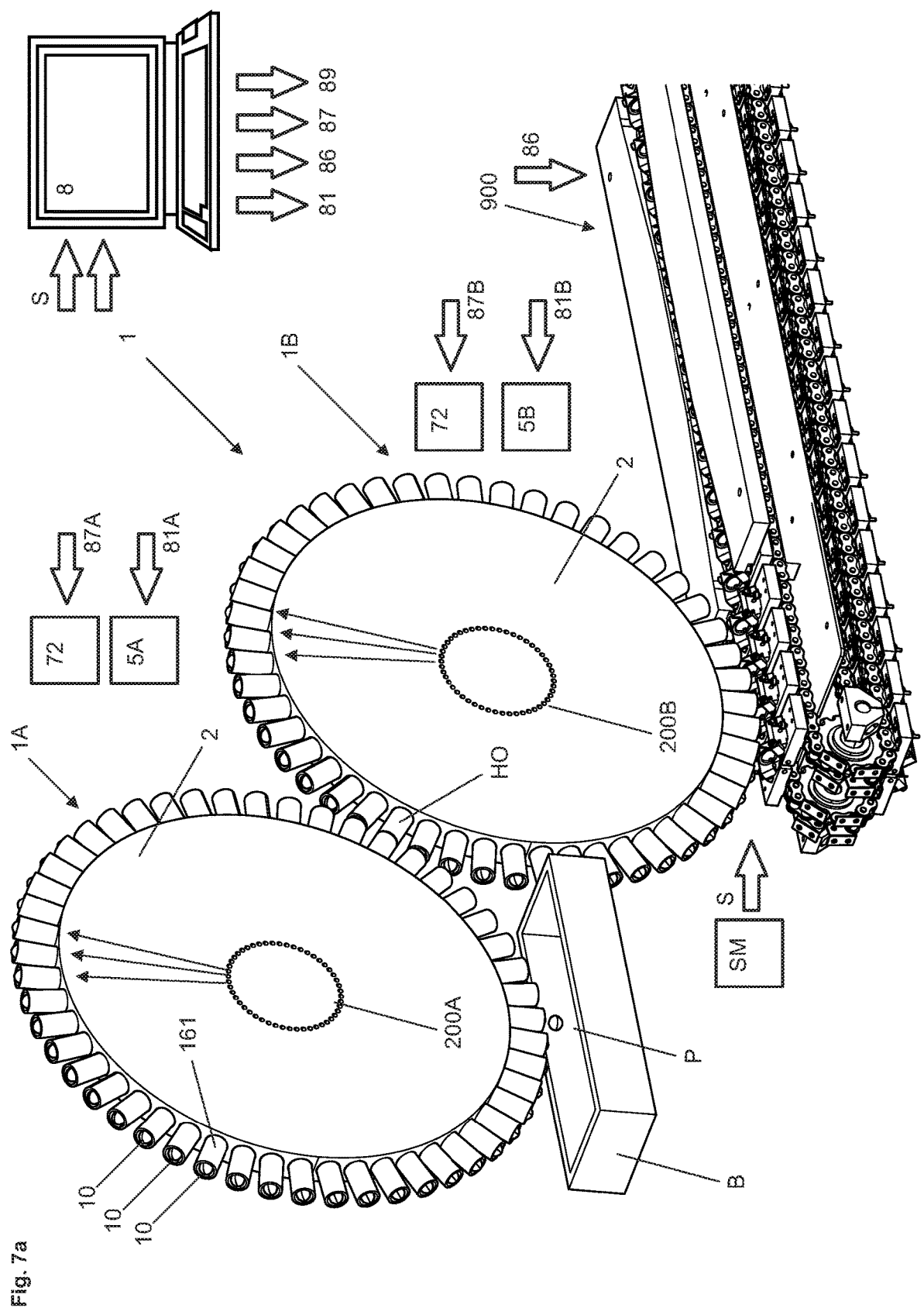
Figure 7B:
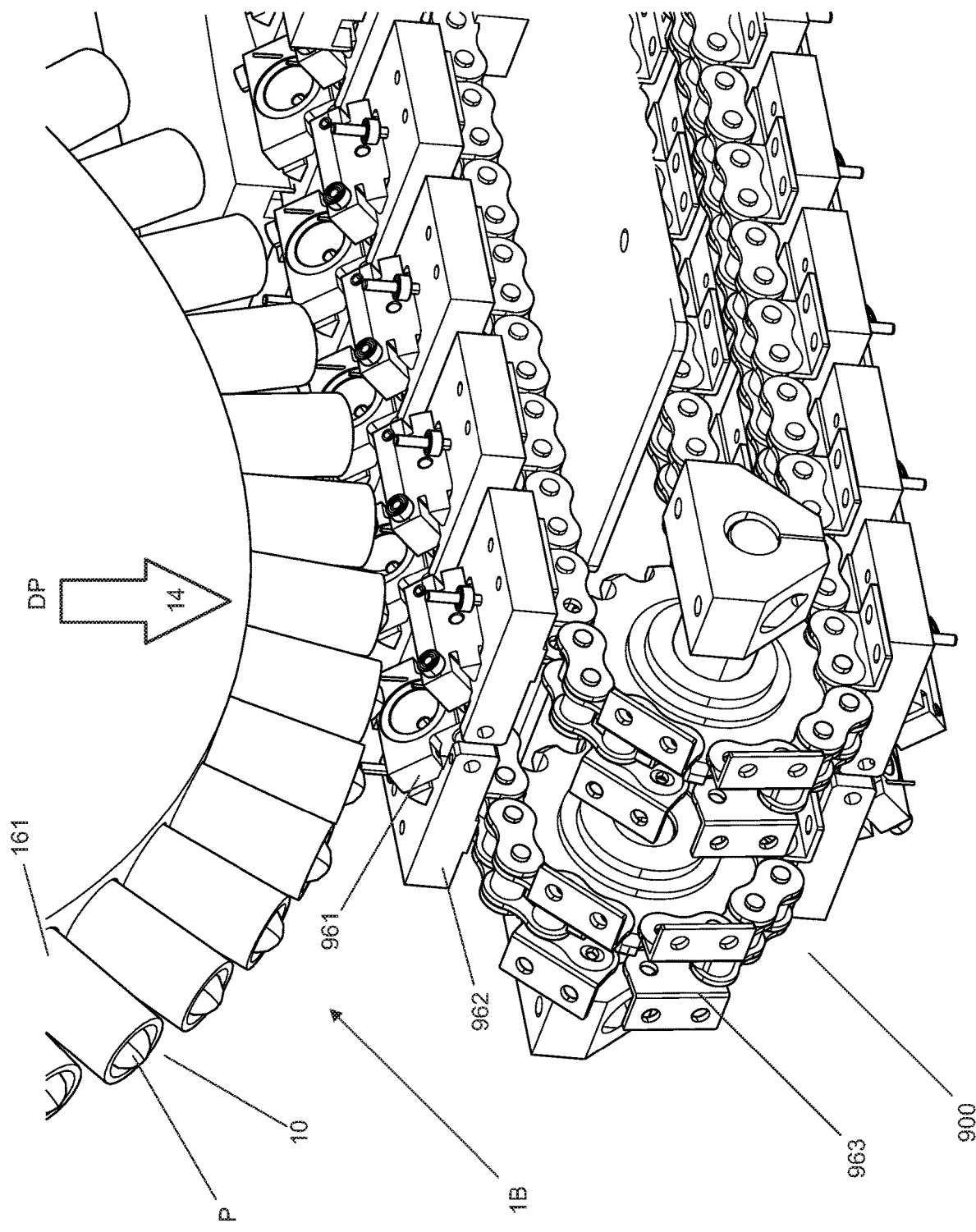

Below, the invention is explained in detail with reference to drawings. Thereby shows:

FIG. 1 a cutting device 9 and a symbolically shown inventive suction device 1 with inventive suction units 10, which are movable by means of a drive device 5 in order to receive objects provided by the cutting device 9;

FIG. 2a a part of the cutting device 9 as well as the suction device 1 of FIG. 1 with suction units 10, by means of which separated disc-shaped objects P can be grasped and transported to a delivery location;

FIG. 2b an inventive suction device 1 with several suction units 10 arranged in a distribution device 2, to which compressed air can be supplied via at least one valve 72, which can be controlled by a control unit 8 via a control line 87 shown symbolically;

FIG. 2c one of the suction units 10 in enlarged view with a suction plate 11 and a deflection unit 12 arranged therein, by means of which a supplied gaseous medium is deflected laterally or radially over the suction plate 11;

FIG. 2d the deflection unit 12 of FIG. 2c, which is designed as a body of rotation and for this purpose has a deflection head 121 to which a mounting element 122 is connected;

FIG. 2e a section through the distribution device 2 of FIG. 2a after removal of one of the suction units 10 from a receiving chamber 21 of the distribution device 2, which is joined to a distribution channel 20 through a chamber opening 210;

FIG. 2f a deflection unit 12 with a deflection head 121, the underside of which is concave to be able to partially receive an sucked-in object;

FIG. 2g a deflection unit 12 with a deflection head 121, the upper side of which is straight and provided with radially extending recesses 120;

FIG. 2h a deflection unit 12 with a deflection head 121, the upper side of which is straight;

FIG. 3a an inventive suction unit 10 in a preferred embodiment having a suction body 16 which holds or is integrally connected to a suction plate 11, in which three radially aligned suction channels 111 are provided, which are displaced by 120° with respect to one another and in which the outlet openings 140 of outlet channels 14 are arranged;

FIG. 3b the suction unit 10 of FIG. 3a in sectional view;

FIG. 3c the suction unit 10 of FIG. 3a in sectional view with three additional deflection units 12A, 12B and 12C;

FIG. 3d a sectional view of the suction unit 10 of FIG. 3c;

FIG. 4 a suction unit 10 having a suction body 16 in which entry channels 13 and outlet channels 14 and outlet openings 140 are located between the suction channels 111, and a central bore divided by a partition 130C into an inlet channel 130A and mounting channel 130B, which serves for optional mounting of the shown deflection unit 12;

FIG. 5a the suction unit 10 of FIG. 3a with a lamellar elastic suction plate 11;

FIG. 5b the suction unit 10 of FIG. 5a in sectional view;

FIG. 5c a part of a preferably designed suction unit 10 with suction channels 111, the cross-section of which is at least approximately constant over its entire length;

FIG. 6a a suction unit 10 in sectional view with a suction plate 11, to which a suction basket 161 is connected, which encloses a downwardly open receiving channel 1600, with twelve entry channels 13 connected to an inlet channel 130, which are directed directly into the edge region of the receiving channel 1600, wherein no deflection unit is provided;

FIG. 6b a suction unit 10 according to FIG. 6a in sectional view with a suction plate 11, which is provided with a deflection unit 12 and to which a suction basket 161 is connected, which optionally has one or more wall openings 160 and encloses a downwardly open receiving channel 1600;

FIG. 6c a suction unit 10, for example according to FIG. 3a, which is provided with a centering device 4 which is connected to the deflection unit 12 and which allows a sucked-in object P to be guided against the central axis x of the suction unit 10 or of the deflection unit 12 and to be held in a centralized manner;

FIG. 6d a suction unit 11 with a suction basket 161, which encloses a receiving channel 1600 without wall openings, and is provided with an optionally provided centering device 4 according to FIG. 6c;

FIG. 6e the suction unit 10 of FIG. 6d with a simpler centering device 4, which has three evenly spaced rod-shaped centering elements 41 aligned along a conical surface, which are held by the deflector element 12;

FIG. 6f the suction unit 10 of FIG. 6d with a centering device 4, which has three evenly spaced wire-shaped or rope-shaped centering elements 41 aligned along a conical surface, which are held on the one hand by the deflecting element 12 and on the other hand by the outlet-side edge of the suction basket 161;

FIG. 6g the suction unit of FIG. 6f with a mounting element 1211 on the deflection head 121 of the deflection unit 12, to which the centering elements 41 are attached;

FIG. 6h the suction unit 10 of FIG. 6d with a grid-shaped centering device 4;

FIG. 6i the suction unit 10 of FIG. 6d with a centering device 4 having three centering elements 41 evenly spaced and aligned along a conical surface, which are held by the outlet-side edge of the suction basket 161;

FIG. 6j the suction unit 10 of FIG. 6d equipped with a holding flange 1615 holding a flange ring 44 with a centering device 4 comprising a blade-shaped holding element 4100;

FIG. 6k a preferably modularly constructed suction unit 10 with several suction units 10 according to one of the FIGS. 6a to 6j in sectional view;

FIG. 6l a suction unit 10 according to FIG. 6b in sectional view with a suction plate 11, into which a deflection unit 12 or merely a sealing pin 122 is to be inserted and to which a suction basket 161 is connected, which optionally has one or more wall openings 160 and encloses a downwardly open receiving channel 1600, which has corresponding recesses 1611, 1612 for receiving articles;

FIG. 7a a suction device 1 with two suction wheels 1A, 1B, which are peripherally equipped with suction units 10 according to one of the figures FIGS. 6a-6k and by which objects P are picked up at a pick-up location and delivered at a delivery location to a conveying device 900;

FIG. 7b a part of the suction device 1 of FIG. 7a with the second suction wheel 1B, from which objects P are delivered to transport units 61 of the conveyor device 900;

FIG. 8a in exploded view a suction unit 10 with a mounting plate 168, the suction body 16 and a suction bell 6, to which a suction basket 161 is connected;

FIG. 8b the assembled suction unit 10 of FIG. 8a with the suction body 16, which is inserted into the mounting plate 168, and the suction bell 6, which encloses the suction body 16 separated by a return channel 60 and which is connected to the mounting plate 168;

FIG. 9a the suction unit 10 of FIG. 8a with the suction body 16, which is integrally connected to the suction bell 6 by the suction basket 161 which is provided with wall openings 160;

FIG. 9b the assembled suction unit 10 of FIG. 9a;

FIG. 10a the suction unit 10 of FIG. 8a with the suction body 16 integrally connected to the mounting plate 168;

FIG. 10b the assembled suction unit 10 of FIG. 10a;

FIG. 11a the suction unit of FIG. 10a with a suction bell 6 having a conically shaped suction basket 161 with a small channel opening 1610 for gripping small objects;

FIG. 11b a suction device 1 with the suction unit of FIG. 11a with a slit-shaped channel opening 1610 adapted to a rod-shaped object or a rod-shaped object P;

FIG. 11c the channel opening 1610 of the suction unit 10 of FIG. 10a in enlarged view;

FIG. 12a the suction unit of FIG. 11a with a suction bell 6, which has on the inside several separating elements 1601, which after assembly of the suction bell 6 connect to the suction body 16 and delimit wall openings 160;

FIG. 12b the assembled suction unit 10 of FIG. 12a;

FIG. 13 the suction unit 10 of FIG. 10a with a suction bell 6 which is connectable to the mounting plate 168 by a bayonet lock having locking elements 69, 169;

FIG. 14 the suction unit 10 of FIG. 10a with a suction bell 6, which is connectable to the mounting plate 168 by a screw cap having closure elements 69, 169;

FIG. 15 a suction unit 10 according to FIG. 6a, but optionally with a deflection unit 12, in sectional view with a suction basket 161, which encloses a downwardly open receiving channel 1600 and which connects at the top to the suction plate 11 and at the bottom to a ring plate 15, which comprises lower suction channels 115; and FIG. 16 a suction unit 10 according to FIG. 6b, but optionally with a deflection unit 12, in sectional view with a suction basket 161, which encloses a downwardly open receiving channel 1600 and which is connected at the top to the suction plate 11 and at the bottom to a ring plate 15, which comprises lower suction channels 115, wherein the suction basket 161 comprises several wall openings 160, which can be covered by means of an adjusting sleeve 3.

FIG. 1 shows in symbolic representation an inventive suction device 1 with inventive suction units 10, which are movable by means of a drive device 5 to pick up objects provided by a cutting device 9. The suction units 10 are preferably supplied with a flow of a gaseous medium by a blower 95 or a pump. The cutting device 9 comprises a plurality of blades 91 connected to ultrasonic transducers 92 and supported by a blade holder 93 to which are coupled actuators 99 hingedly connected to a framework 90, by means of which the blades 91 can perform movements within a working space to separate from a process material an object that can be picked up, transported and delivered again by means of the suction units 10. The suction device 1 and the cutting device 9 or the working processes of these devices are synchronously controlled by a control unit 8. Preferably, the blower 95 or the pump 95, for example a piston pump, is also controlled by means of the control unit 8.

FIG. 2a shows a part of the cutting device 9 of FIG. 1 as well as an inventive suction device 1 with suction units 10, by means of which separated disk-shaped objects P can be grasped and transported to a delivery location. The blades 91 are connected by curved coupling elements 922 to the ultrasonic transducers 92, to which alternating voltages with frequencies in the ultrasonic range can be supplied via connecting leads 921. The blade holder 93 includes mounting devices 931 by means of which the ultrasonic transducers 92 can be mounted by screws.

A process material P0, for example bread, is fed on a conveyor belt 99, which is cut into slices or product units or objects P. The objects P are gripped and held by the suction device 1 or suction units 10 of the suction device 1 and can be conveyed or moved from the pick-up location to a delivery location. For this purpose, the suction device 1 comprises a tubular drive device 5 which is rotatably held by a mounting ring 51. The picked-up objects P can therefore be rotated from the pick-up position shown, for example by 90° downwards, to a delivery position. At the delivery position, several objects P are typically stacked and conveyed further by means of a conveyor belt.

FIG. 2b shows an inventive suction device 1 with several suction units 10 arranged in a distribution device 2, to which compressed air can be supplied via at least one valve 72, which can be controlled by a control unit 8 via a control line 87 shown symbolically. The compressed air supplied via supply lines 71 is distributed to all suction units 10 via the distribution device 2, which has a distribution channel. A drive device 5 is symbolized by arrows, to which a control signal 81 can be supplied by the control unit 8 in order to actuate the drive device 5 or to move and, if necessary, rotate the suction units 10 along any desired path.

The control unit 8 can control the entire working process, the conveyor 99, the cutting device 9 with control signals 89, the suction device 1 with control signals 81, valves 72 with control signals 87 and a conveyor device 900 (see FIG. 7b), which transports away conveyed or stacked objects P, with control signals 86.

FIG. 2c shows an enlarged view of one of the suction units 10 inserted in the distribution device 2. It can be seen that in this preferred embodiment, a plurality of shaping elements 113 are provided on the underside of the distribution device 2, which can engage with the object P and prevent lateral displacement. The received objects P are therefore held securely even at greater accelerations. The suction units 10, which are preferably designed as rotating bodies, have a suction plate 11 and, in this preferred embodiment, a deflection unit 12.

FIG. 2d shows the deflection unit 12 of FIG. 2c, which is designed as a mushroom-shaped body of rotation and has a deflection head 121 and a pin-shaped mounting element 122 adjoining the deflection head 121. On the side facing the suction plate 11, the deflection head 121 has a circumferential groove-shaped depression 120 which preferably extends in a rounded manner towards the edge of the deflection head 121. In a section through the axis of rotation, the deflection unit 12 thus has at least approximately an anchor-shaped cross-section.

FIG. 2f shows a deflection unit 12 with a deflection head 121, the underside of which is concave in order to be able to partially receive and hold centered a sucked-in object P, for example a nut according to FIG. 6c.

FIG. 2g shows a deflection unit 12 with a deflection head 121, the upper side of which is straight and provided with radially extending recesses 120.

FIG. 2h shows a deflection unit 12 with a deflection head 121 whose upper side is straight. By designing the deflection unit 12 and the deflection chamber 115 accordingly, the circular outwardly extending deflection channel 110 can be adapted to the respective requirements.

FIG. 2e shows a section through the at least approximately cuboid distribution device 2 of FIG. 2a, which has a distribution channel 20 and numerous receiving chambers 21. The distribution channel 20 is separated from the receiving chambers 21 by a separating plate 22 but has a chamber opening 210 for each of the receiving chambers 21. Compressed air can therefore be supplied through the distribution channel 20 and the chamber openings 210 to the suction units 10 in the receiving chambers 21. The suction units 10 can be inserted in a simple manner into the receiving chambers 21, closely adjacent to the chamber openings 210. A sealing ring 24 is provided on the top of the suction units 10, which fits tightly against the border of the chamber opening 210 and ensures that the compressed air can only escape via the suction unit 10. The suction units 10 have a suction body 16 which is enclosed by an annular groove 166. An inserted suction unit 10 can be fixed in a simple manner by means of a fork-shaped clamp 25, which is inserted into the receiving chamber 21 through adapted openings in such a way that it engages in the annular groove 166 of the inserted suction unit 10 and thereby holds it. Suction units 10 can therefore be loosened and removed with a handgrip and reinserted, for example, after maintenance work. A strip 29 is mounted on the underside of the distribution device 2, which has through-openings 290 for the suction units 10 and shaped elements 113 which can engage in the surface of sucked-in objects P and fix them in place.

The inventive suction device 1 can therefore be manufactured, assembled and also maintained in a simple manner.

FIG. 3a shows an inventive suction unit 10 in a preferred embodiment with a suction body 16 holding a suction plate 11 which is provided with three radially aligned suction channels 111 displaced by 120° relative to each other.

FIG. 3b shows a sectional view of the suction unit 10 of FIG. 3a, which is designed as a rotating body. The suction plate 11 is integrally connected to the suction body 16, which is made of a plastic, for example, and is slightly offset from it by a circumferential annular groove 166.

The suction body 16 has an inlet channel 130 coaxial with the axis of rotation, from which several entry channels 13 branch off. From below, a deflection unit 12, as shown in FIG. 2d, is inserted with the mounting element 122 into the inlet channel 130 so that the inlet channel 130 is closed at the front and the gaseous medium or compressed air can only reach the front of the suction plate 11 through the outwardly extending entry channels 13.

As also shown in FIG. 4, the suction plate 11 has a preferably cylindrical recess which serves as a deflection chamber 115. The outlet openings of the entry channels 13 are arranged within the deflection chamber 115 behind the deflection head 121 of the deflection unit 12, so that the inflowing medium can be introduced to the rear side of the deflection head 121 and from there into a deflection channel 110, which is delimited on the one side by the front side of the suction plate 11 and on the other side by the rear side of the deflection head 121, if the deflection unit 12 has been inserted. If no deflection unit 12 is inserted, the deflection channel 110 is delimited by the sucked-in object. The gaseous medium is guided radially outward through the deflection channel 110 so that it can flow through the three suction channels 111 on the one hand and between the suction plate 11 and a sucked-in object (not shown) on the other hand, causing a corresponding vacuum.

The suction channels 111 are radially extending recesses within the suction plate 11 and extend from the deflection chamber 115 preferably to the outer edge of the suction plate 11. After the suction of an object P, it is therefore always ensured that the medium can escape through the suction channels 111, which are preferably open on the outlet side, and that the desired suction effect is always ensured along the suction channels 111, irrespective of the nature of the sucked-in object P.

Preferably, a plurality of uniformly distributed suction channels 111 is provided. Particularly advantageous is the arrangement of three evenly distributed suction channels 111, which for example run radially outward and are offset from each other by 120°.

Preferably, several evenly distributed entry channels 13 are provided. Particularly advantageous are six evenly distributed entry channels 13, which are inclined outward and offset from each other by 60°. In this embodiment, the entry channels 13 define a pyramid with a corresponding number of edges.

FIG. 3b further shows that outlet channels 14 are routed through the suction body 16, the outlet openings 140 of which are arranged within the suction channels 111.

Exemplarily, it is shown that compressed air can be introduced through a first valve 72A into the inlet channel 130 and further into the entry channels 13 and through second valves 72B into the outlet channels 14. Symbolically, it is shown that the decentrally arranged valves 72A, 72B can be controlled by the control unit 8 (see FIG. 2b) by means of control signals 87A, 87B. Optionally, therefore, compressed air can be passed through the entry channels 13 to draw in an object P or into the outlet channels 14 to discharge the held object P at desired time intervals. The elements 72A, 72B shown may also be simple connection elements through which compressed air is supplied to the suction unit 10. In this case, valves are provided centrally, allowing simpler electrical wiring of the control lines 87A, 87B.

By introducing compressed air through the outlet channels 14 directly into the suction channels 111, a pressure can be quickly built up there over a relatively large area, by means of which the held object P is repelled.

FIG. 3c shows the suction unit 10 of FIG. 3a in sectional view with three additional deflection units 12A, 12B and 12C arranged concentrically to the central deflection unit 12 according to FIG. 3a. Each of the additional deflection units 12A, 12B, 12C is also associated with an inlet channel 130, entry channels 13 and a deflection chamber 115. In turn, suction channels 11 can adjoin the deflection chambers 115. In the embodiment shown, however, no suction channels 111 are directly assigned to the deflection units 12A, 12B, 12C. The gaseous medium is therefore directed by the deflection units 12A, 12B, 12C over the surface of the suction plate 11, thus avoiding direct contact with the sucked-in object. The central deflection unit 12 and its suction channels 111 thus ensure that the object is reliably sucked in, while the other deflection units 12A, 12B, 12C also develop a suction effect and additionally prevent contact with the suction plate 11. In this way, separation from the object by a media film can be realized with a good suction effect.

FIG. 3d shows a sectional view of part of the suction unit 10 of FIG. 3c. It is shown that the media flow can enter the deflection chamber 115 via the inlet channel 130 and the entry channels 13, where it is guided radially outward in the annular deflection channel 110. From the deflection chamber 115, the media flow can enter the suction channels 111 laminarly via a preferably rounded surface.

FIG. 4 shows a preferably designed suction unit 10, which can optionally be equipped with a deflection unit 12.

The suction body 16 of the suction unit 10 of FIG. 3b is provided with outlet channels 14 and outlet openings 140, which are located between the suction channels 111. It is also possible to arrange the outlet openings 140 inside and outside the suction channels 111. Symbolically, the course of the media flows controlled by valves 72A, 72B is shown.

The cross-section of the suction channels 111 is clearly visible in this illustration. At the channel inlet adjacent to the deflection chamber 115, the channel cross-section has a minimum size which increases by a factor of 5 to 10 up to the channel outlet. Such a course allows the diameter of the suction plate 11 to be increased and larger, possibly also heavier, objects P to still be held securely. The dimensioning of the suction channels 111 with the course of the depth and width can be adapted to the nature of the objects P as required. The cross-sectional shape can be constant or increase or decrease radially outwards. Dotted lines indicate that the bottom 1110, 1110* of the suction channels 111 can be lowered to the height of the bottom of the deflection chamber 115, so that the height of the deflection chamber 115 corresponds approximately to the depth of the suction channels 111. In this case, the transition from the deflection chamber 115 to the suction channels 111 is smooth and the gaseous medium can flow away unhindered.

In this preferred embodiment, the suction body 16 has a central bore which is divided by an intermediate wall 130C into two parts 130A, 130B which are completely separate from one another. Compressed air can be introduced into the upper part 130A of the central bore, from which preferably six entry channels 13 branch off, via a valve 72A shown schematically. The lower part 130B of the central bore forms a mounting opening 130B into which the mounting element 122 of the deflection unit 12 can be inserted.

The lower part 130B can also be completely filled so that no deflection unit 12 can be used. Alternatively, a pin can be inserted detachably into the mounting opening 130B. If no deflection unit 12 is used, the depth of the suction channels 111 is preferably increased.

The function of the outlet channels 14, which are only optionally provided, has been explained with reference to FIG. 3b.

FIG. 5a shows the suction unit 10 of FIG. 3a with a lamellar elastic suction plate 11. The diameter of the suction body 16 has been reduced and is only slightly larger than the diameter of the receiving chamber 115. the suction plate 11 therefore consists peripherally of a thin annular lamella which can deform and adapt to a held object P under the action of the suction force. For this purpose, the suction plate 11, which is preferably integrally connected to the suction body 16, is made of an elastic material. The suction plate 11 can also be a thin metal plate into which the suction channels 111 are formed or stamped. A suction plate of this type can be connected to a centrally arranged sleeve which is connected to the suction body 16, for example glued, screwed or pressed.

FIG. 5b shows the suction unit 10 of FIG. 5a in sectional view.

FIG. 5c shows a sectional view of a preferably designed suction unit 10 with a lamellar suction plate 11, which has suction channels 111 with a constant channel cross-section.

The channel cross-section of the suction channels 111 of suction units 10 according to the invention can therefore be constant or change as described above. The cross-section at the outlet and at the inlet of the suction channels 111, which have a constant or changing channel cross-section, can be specially selected. The channel cross-section facing the deflection chamber 115 may be very small. The channel cross-section at the outer end of the suction channels 111 may be unchanged or reduced. In this case, it is possible that the gaseous medium is displaced from the suction channel near the edge of the suction plate and must escape between the suction plate and the held object in a thin film of medium. In this way, fluttering or detachment of the periphery of the object from the suction plate can be avoided. Such an embodiment with peripherally closed suction channels 111 is preferably provided for objects that have a very low inherent stability and should be peripherally secured.

FIG. 5c further shows that the bottom side of the deflection head 121 of the deflection unit 12 and the front side of the suction plate 11 are aligned at least approximately in one plane. In this way, a sucked-in object P is supported in a plane so that it cannot deform. If desired, the deflection unit 12 can also be shifted inward so that it deviates, for example, a fraction of a millimeter from the plane defined by the front side of the suction plate 11.

Schematically, it is further shown that the mounting element 122 of the deflection unit 12 has a formation which serves to lock the mounting element 122 in the central bore 130. Preferably, the formation is annular and surrounds the mounting element 122 with a thickness, for example, in the range of $1/10$ mm-$1/100$ mm. Several such sealing rings may also be provided, by means of which the mounting element 122 is locked in the inlet channel 130.

FIG. 6a shows a suction unit 10 in sectional view with a suction plate 11, to which a suction basket 161 is connected, which encloses a downwardly open receiving channel 1600. The suction unit 10 comprises a suction body 16, which can be mounted in a device according to FIG. 2e, and twelve entry channels 13, which are connected to an inlet channel 130 and are directed outwards into the edge region of the receiving channel 1600 against the inside of the suction basket 161. The gaseous medium flowing in through the entry channels 13, which adjacent to one another preferably enclose equal angular spacings, is therefore blown against the inner wall of the suction basket 161, where it forms a thin, hollow cylindrical film that flows downward at a high flow velocity. A pressure reduction is thus formed in the flow zone through which an object can be sucked in. It should be noted that the object itself additionally shifts the stream flow outward and further reduces the flow cross-section, which is why the flow velocity and the negative pressure within the suction basket 161 additionally increase. In this preferred embodiment, a centering device 4 is also provided, by means of which the sucked-in object is kept centered.

Since a thin fast-flowing media film is inevitably formed on the inside of the suction basket 161, a deflection unit 12 is optionally omitted in the embodiment of FIG. 6*a*. The suction plate 11 is therefore tightly sealed in the middle and only has openings for the entry channels 13.

FIG. 6*b* shows a suction unit 10 preferably according to FIG. 3*a* with a suction plate 11, to which a suction basket 161 is connected, which encloses an outwardly open receiving channel 1600 and in this embodiment is provided laterally with wall openings 160. The suction basket 161 is integrally connected to the suction body 16, which in turn has a suction plate 11 and a deflection unit 12 at the front. The dimensions of the suction basket 161 are preferably adapted to the objects P. For example, the suction basket 161 is hollow-cylindrical in shape and, if necessary, peripherally conical in shape, so that objects P can be grasped more easily. On the other hand, the suction basket 161 can also have an oval, rectangular or polygonal cross-section.

The basket openings 160 are preferably closable by means of a closing element 3, as shown exemplarily for the suction unit 10 according to FIG. 16.

The suction units 10 of FIG. 6*a* and FIG. 6*b*, which are provided with a suction basket 161, can be used to grasp and securely hold objects P that do not have flat surfaces. For example, nuts, for example hazelnuts, can be grasped and held. The height of the suction basket 161 is dimensioned according to the size of the objects P or a fraction thereof. Preferably, several rows of superimposed wall openings 160 are provided through which the media flow can escape laterally.

Preferably, suction units 10 as described above are provided with a suction basket 161. However, it is also possible to provide conventional suction units, which have a suction body 16 with at least one entry channel 13, a suction plate 11 firmly or detachably connected to the suction body 16, and a deflection unit 12, with a suction basket 161.

It should also be noted that the suction basket 161 of the suction unit 10 of FIG. 6*a* has no wall openings. In this embodiment, it must therefore remain ensured that no stall occurs when the object is picked up, which would cancel out the suction effect. This is ensured in particular by the type of sucked-in objects as well as by the centering device 4.

The suction basket 161 of the suction unit 10 of FIG. 6*b*, however, has wall openings 160 at different heights. The wall openings 160 ensure that no stall occurs when an object is sucked into the suction basket 161. When the object P enters, the wall openings 160 of different heights are sequentially closed until only the uppermost wall openings 160 are exposed. This ensures that the media film runs as far down as possible and that an optimum suction effect is still achieved as far down as possible. It is also possible to keep only the three uppermost wall openings 160 or wall slots 160 open, but this changes the course of the media film.

FIG. 6*c* shows a suction unit 10 e.g., according to FIG. 3*a*, which is provided with a centering device 4, which is connected to the deflection unit 12 and which allows to guide a sucked-in irregular, e.g., roundish object P against the central axis x of the suction unit 10 respectively of the deflection unit 12 and to keep it centered.

The suction unit 10 in turn comprises a deflection unit 12, by which the centering device 4 is held. Centering devices 4 are preferably funnel-shaped, so that objects picked up are automatically guided upwards towards the funnel axis x. To ensure that air circulation is not interrupted, open or air-permeable centering devices 4 are used.

The centering device 4 shown comprises three centering elements 41 aligned along a cone, which at one end form the cone tip held by the deflection unit 12 and which at the other end are connected to each other by a receiving ring 42. By means of the receiving ring 42, an object P, for example a nut, can be pre-centered so that it can subsequently be more easily sucked along the centering elements 41 against the deflection unit 12 and centered. The effect of the centering device 4 is that the object P is held centrally, and the gaseous medium can flow over it in the manner of an umbrella. The suction force can therefore develop uniformly, whereby the object can be held securely.

FIG. 6*d* shows a suction unit 11 with a suction basket 161, which has no lateral wall openings, and which encloses a receiving channel 1600, and with an optionally provided centering device 4 according to FIG. 6*c*. The suction basket 161 ensures that the gaseous medium can flow laminarly downward or outward along its cylindrical inner wall, whereby a uniform cylindrical medium flow is forcibly created and a negative pressure results in the center of the receiving channel 1600, which ensures the safe suction even of objects P having an unfavorable shape.

By the centering device 4 it is again ensured that the object P is centered and does not come into contact with the media film. Without the centering device 4, the suction of the objects P would also succeed advantageously, whereby the reliable detection of the objects P could take somewhat longer.

FIG. 6*e* shows the suction unit 10 of FIG. 6*d* with a simpler centering device 4, which has three evenly spaced rod-shaped centering elements 41 aligned along a conical surface and held by the deflector element 12. A retaining ring 42 has been dispensed with. The centering elements 41 are aligned in a straight line. In preferred embodiments, however, the centering elements are bent slightly outwardly so that they can securely grip objects P in a wider environment.

FIG. 6*f* shows the suction unit 10 of FIG. 6*d* with a centering device 4, which has three evenly spaced wire-shaped or rope-shaped centering elements 41 aligned along a conical surface, which are held on one side by the deflection element 12 and on the other side by the outlet-side edge of the suction basket 161. The centering elements 41 are anchored at one end in the deflection element 12 or in the deflection head 121 and are provided on the other side with a mounting ball 46, which is anchored in a mounting opening 1680 on the outlet side in the edge of the suction basket 161.

FIG. 6*g* shows the suction unit of FIG. 6*f* with a mounting element 1211 on the deflection head 121 of the deflection unit 12, to which the centering elements 41 are attached.

FIG. 6*h* shows the suction unit 10 of FIG. 6*d* with a grid-shaped centering device 4, which has grid rods or grid cables as centering elements 41, which are anchored in the suction basket 161 with mounting balls 46. In this embodiment, the hollow-cylindrical media flow is shown running downward in the receiving channel 1600 along the cylindrical basket wall and generating a vacuum in the region of its central axis, along which an object P, for example a nut, is guided against the centering device 4.

FIG. 6*i* shows the suction unit 10 of FIG. 6*d* with a centering device 4, which has three evenly spaced centering elements 41 aligned along a conical surface, which are held by the outlet-sided edge of the suction basket 161 and are inclined with their ends towards the central axis x. The centering elements 41 form an open funnel, which ensures that the objects P are not guided against the inner wall of the suction basket 161 and ejected again.

FIG. 6*j* shows the suction unit 10 of FIG. 6*d* equipped with a holding flange 1615, which holds a flange ring 44 with a centering device 4 comprising a blade-shaped holding element 4100. This centering device 4 can be used to advantageously hold lighter and less dimensionally stable objects. It is also possible to use a shorter suction basket 161. The flange connection can also be used in the embodiment of FIG. 6*i*.

FIG. 6*k* shows in sectional view a preferably modular suction unit 10 with several suction units 10 according to one of the FIGS. 6*a* to 6*j*, which are each provided with a deflection unit 12, 12A, 12B, 12C and a suction basket 161, 161A, 161B, 161C. In each suction basket 161, 161A, 161B, 161C, a centering device 4 with centering elements 41; 42 is preferably provided, which can be configured as desired in order to optimally grip and center objects P.

This suction unit 10 allows several objects P to be picked up and dispensed at the same time. Often, objects P should be picked up in a certain grid and/or delivered again, if necessary to an intermediate product or to a packaging. Since intermediate products and packaging often change, it is preferably provided according to the invention that inventive suction units 10 are modular and can be assembled as desired. For example, suction body modules 100 are provided which are connected to each other positively, non-positively, or otherwise, optionally screwed to each other. Where appropriate, suction body modules 100 are provided with one or more deflection units 12 and suction plates 11, which can be assembled in the manner of LEGO® modules. In this way, for example, the suction head of a robot can be arbitrarily adapted to intermediate products and packaging. For example, a suction head is assembled with suction units that allow to be grasped in a grid and inserted into provided chocolate. For example, the suction unit 10 is designed in such a way that a chocolate can be loaded with several nuts in a single operation during the manufacturing process.

FIG. 6*l* shows a sectional view of a suction unit 10 according to FIG. 6*b* with a suction plate 11 into which a deflection unit 12 or merely a sealing pin 122 is to be inserted and to which a suction basket 161 is connected. The suction basket 161 optionally has one or more wall openings 160 and encloses a downwardly open receiving channel 1600 which has corresponding recesses 1611, 1612 for receiving objects. Exemplarily, it is shown that rectangular objects can be received in the indentations 1611, 1612. For example, first an object is received in the upper indentation 1612 and subsequently an object is received in the lower indentation 1611. Provided that the receiving channel 1600 is closed by one of the objects, the media flow can flow out through the wall openings 160, thereby maintaining the suction pressure. The number and design of the recesses 1611, 1612 can be selected as desired.

The above-described suction units 10 or aggregates of suction units 10 are preferably provided with suction channels 111. In particular, in the case of suction units 10 or aggregates of suction units 10 which are provided with suction baskets 161, said suction channels 111 can also be dispensed with.

The features of the various embodiments of the suction units 10 can therefore be combined as desired. The suction units 10 according to FIGS. 6*a*-6*l* can thus advantageously be realized with or without suction channels 111. It should be noted that in these designs the suction plate 11 is normally separated from the objects P by the centering device 4 used respectively.

The optionally provided centering devices 4 can be made entirely or partially of metal or plastic. The parts can be of strong or elastic design, whereby care must be taken, for example by shaping, that objects P do not jam in the centering device 4 and can be released again without difficulty.

FIG. 7*a* shows a suction device 1 with two suction wheels 1A, 1B, which are peripherally equipped with suction units 10 according to one of the FIGS. 6*a* to 6*k* and by which objects P are picked up at a pick-up location and delivered to a conveying device 900 at a delivery location. The first suction wheel 1A picks up objects P, for example nuts, from a container B and conveys them to a transfer location, at which the transfer to the second suction wheel 1B takes place, which transports the picked-up object P to the delivery location and delivers it there to the conveying device 900. The compressed air supply to each suction unit 10 is preferably individually controllable by a plurality of suction channels 200A, 200B so that an object P can be picked up by one suction unit 10 and at the same time an object P can be delivered by another suction unit 10. Each suction unit can also be supplied with two pressure lines, the first of which is connected to entry channels 13 and the second to outlet channels 14. At the transfer point HO, a suction unit 10 of the first suction wheel 1A, whose object P is ejected, and a suction unit 10 of the second suction wheel 1B, which sucks in the object P, are located opposite each other.

The control of the drive devices 5A, 5B of the suction wheels 1A, 1B and the valves 72 of the suction channels 200A, 200B is performed by the control unit 8 by means of control signals 81A, 81B; 87A, 87B. The conveying device 900 is controlled synchronously with the suction wheels 1A, 1B by control signals 86.

For synchronous control of the device units 1A, 1B, or for checking the position and quality of objects P held by transparent suction units 10, the control unit 8 preferably processes sensor signals S emitted by sensors SM, typically optical sensors or cameras.

FIG. 7*b* shows a portion of the suction device 1 of FIG. 7*a* with the second suction wheel 1B, from which objects P are delivered at a delivery position to transport units 961 of the conveyor device 900. The transport units 61 are mounted on mounting plates 962 which are conveyed by a chain 963. At the front, the mounting plates are removed. The transport units 961 are formed in two parts and can be opened and closed. On the right side of FIG. 7*b* a channel is shown into which the transport units 961 are retracted and closed. To ensure that the transported objects P are dispensed correctly in terms of time and do not remain briefly in the suction unit 10 or its suction basket 161, an air pulse is preferably introduced into the outlet channels 14 at the dispensing point, as shown symbolically.

FIG. 1 further shows that the suction units 10, as described above with reference to the drawings, are supplied with compressed air from a media pressure device 95, a blower or a pump, via at least one line 950. All inventive suction devices 1 and suction units 10 can advantageously be operated with a blower 95 comprising a propeller. It has been shown that a reduction in the diameter of the inlet channel 130 and/or the entry channels 13 connected thereto can paradoxically increase the suction power or suction force of the suction units 10. Using a blower device instead of a pump significantly reduces the cost of the suction device 1. If necessary, two or more blowers can be connected in series to increase the pressure.

Inventive suction units with an adapted inlet channel can already be operated with a medium pressure in the range of 1 bar. The use of expensive piston pumps can thus be avoided.

In order to select the optimum suction power of one of the suction units 10 described above in conjunction with a connected blower 95 or an aggregate of blower units, the diameter of the inlet channel 130 and/or the entry channels 13 connected thereto is changed until objects P with maximum weight can be captured. Particularly advantageously, a blower 95 can be used in conjunction with suction units 95 as shown in FIGS. 6a-6j. By optimizing the inlet channel 130 and/or the entry channels 13 adjoining it, it can be ensured that the air flow along the suction plate 11 and along the inner wall is laminar, resulting in a correspondingly high negative pressure. In preferred embodiments, it is provided that between the suction plate and the inner wall of the suction basket there is a transition running along a curve, possibly along a circular line.

FIG. 8a shows an exploded view of a suction unit 10 with the suction body 16, a mounting plate 168 and a suction bell 6, to which a suction basket 161 is connected. In this embodiment, the suction body 16 is connectable to a mounting plate 168 by screws or bolts 167. The mounting plate 168 has a transfer channel 1683, into which a nozzle 165 formed on the suction body 16 and connecting to the mounting channel 130 can be inserted. Furthermore, the mounting plate 168 has an outlet opening 1680.

The suction bell 6, which can also be connected to the mounting plate 168 by screws or bolts 167, has a bell chamber 600 into which the suction body 16 can be inserted. Adjacent to the underside of the suction bell 6 is the suction basket 161, which encloses the suction channel 1600. The suction basket 161 can therefore be integrally connected or connectable to the suction body 16 or to the suction bell 6.

FIG. 8b shows a suction device 1 with the assembled suction unit 10 of FIG. 8a with the suction body 16 inserted into the mounting plate 168 and the suction bell 6, which encloses the suction body 16 separated by a return channel 60 and which is connected to the mounting plate 168. The suction body 16 is connected only to the mounting plate 168 and projects into the bell chamber 600 in such a way that the suction plate 11 is separated from the suction basket 161 only by an annular slot 1616 and that between the inner wall of the suction bell 6 and the suction body 16 only the return channel 60, which is dimensioned as desired and encloses the suction body 16 annularly, is kept free.

From an air pressure device or media pressure device 95, a medium L can therefore be circulated through the suction unit 10, which generates a negative pressure in the suction basket 161. The medium L discharged from the media pressure device 95 runs through the inlet channel 130 and the entry channels 13 of the suction body 16 to the deflection head 12 and is there guided through the deflection channel 110 (see FIG. 3d), via the suction plate 11, through the annular slot 1616, the return channel 60 and the at least one outlet opening 1680 back to the media pressure device 95. Dirt particles can be removed from the media flow in a filter F provided within the circulation circuit, preferably in the blower 95.

Due to the circulation of the medium, only little energy and hardly any external medium Lx has to be supplied to the media pressure device 95. The suction device 1 and the suction unit 10 operate with maximum efficiency. At the same time, the medium L is not fed to the outside, thus avoiding undesirable effects on the work process and process materials. The suction bell 6 also encloses the suction unit 10, which is why foreign materials can hardly penetrate the suction unit 10; this is particularly the case when the channel opening 1610 is adapted to the objects P to be sucked in.

The suction device 1 is shown schematically and can be designed as a tool that is moved manually, by a robot or by another drive device.

FIG. 9a shows the suction unit 10 of FIG. 8a with the suction body 16, which in this embodiment is integrally connected to the suction bell 6 by the suction basket 161. The suction basket 161 is provided between the suction body 16 and the wall of the suction bell 6 with slit-shaped wall openings 160, through which the gaseous medium is guided back to the outlet opening 1680 through the return channel 60.

FIG. 9b shows the assembled suction unit 10 of FIG. 9a. The one-piece production of the suction body 16 and the suction bell 6 allows the suction unit 10 to be manufactured more cost-effectively and precisely.

FIG. 10a shows the suction unit 10 of FIG. 8a with the suction body 16 integrally connected to the mounting plate 168. FIG. 10b shows the assembled suction unit 10 of FIG. 10a. Due to the one-piece production of the suction body 16 and the mounting plate 168, the suction unit 10 can be manufactured cost-effectively and precisely.

FIG. 11a shows the suction unit of FIG. 10a with a suction bell 6, which has a conically shaped suction basket 161 with a small channel opening 1610 for gripping small objects. The suction basket 161 can thus be of any shape and advantageously adapted to the working environment. The suction basket 161 can also taper disproportionately or concavely downward. The suction basket 161 can be rotationally symmetrical or approximately elliptical in cross section, for example.

FIG. 11b shows a suction device 1 with the suction unit of FIG. 11a with a slit-shaped channel opening 1610, which is adapted to a rod-shaped object P. This adaptation allows objects P with high suction pressure to be safely grasped without further particles being sucked in from the working area. The sucked-in object closes the adapted channel opening 1610. The high efficiency of the suction units allows the use of a cost-effective and energy-efficient blower 95, which drives the medium through the suction unit 10. The suction device 1, designed as a hand tool, can be used for example for surgical purposes to manipulate tissue or surgical tools.

FIG. 11c shows the channel opening 1610 in enlarged view.

FIG. 12a shows the suction unit of FIG. 10a with a suction bell 6, which has several separating elements 1601 on the inside, which connect to the suction body 16 after assembly of the suction bell 6 and delimit wall openings 160. FIG. 12b shows the assembled suction unit 10 of FIG. 12a. In this embodiment, suction bells 6 can be easily fabricated with wall openings 160 sized as desired. The separators 1601 can be formed wide to define narrow wall openings 160 or can be formed narrow to define wide wall openings 160.

FIG. 13 shows the suction unit 10 of FIG. 10a with a suction bell 6 that can be connected to the mounting plate 168 by a bayonet lock with corresponding locking elements 69, 169. FIG. 14 shows the suction unit 10 of FIG. 10a with a suction bell 6, which can be connected to the mounting plate 168 by a screw closure with corresponding closure elements or threaded elements 69, 169. These suction units 10 can be easily assembled and opened again to perform maintenance work.

FIG. 15 shows a suction unit 10 according to FIG. 6a, but optionally with a deflection unit 12, in sectional view with a suction basket 161, which encloses a downwardly open receiving channel 1600 and which connects at the top to the suction plate 11 and at the bottom to a ring plate 15, which has lower suction channels 151.

FIG. 16 shows a suction unit 10 according to FIG. 6b, but optionally with a deflection unit 12, in sectional view with a suction basket 161, which encloses a downwardly open receiving channel 1600 and which is connected at the top to the suction plate 11 and at the bottom to a ring plate 15, which has lower suction channels 151. The suction basket 161 has wall openings 160 which can be completely or partially covered by means of a closure element 3, preferably an adjustment sleeve 3. The adjusting sleeve 3, which encloses the suction body 16, preferably has an internal thread corresponding to an external thread on the outside of the suction body 16. The threaded sleeve can therefore be easily rotated to close the wall openings 160 as needed. The suction unit 10 can therefore be adapted to objects to be accommodated as required.

Hence, all suction units equipped with a suction basket may or may not be equipped with a deflection unit 12. If no deflection unit 12 is provided, the inlet channel 130, via which the gaseous medium is distributed to the entry channels 13, is closed below the distribution point. The suction body 16 may close the inlet channel 130 integrally. Alternatively, the inlet channel or mounting channel 130 may optionally be closed by a pin if no deflection unit is mounted.

The ring plate 15 of the suction units 10 of FIG. 15 and FIG. 16, which adjoins the channel opening 1610 of the suction basket 161, allows objects to be picked up in a controlled manner into the suction basket 161 or to the edge or channel opening 1610 of the suction basket 161. When the suction units 10 are lowered onto an object, the object is kept centered by means of the ring plate 15 or the radial flow of the medium along the underside of the ring plate 15 and can be lifted vertically in a controlled manner. The lower suction channels 151 again ensure a constant flow of medium when an object is contacted and sucked in. The suction channels 115 again have a cross-section or a cross-sectional shape adapted to the objects to be picked up. Within the pick-up channel 1600, a centering device 4 is optionally provided, for example with four threads or wires, by means of which the object can be held centered.

The invention claimed is:

1. A suction unit suitable for suctioning an object according to Bernoulli's principle, comprising:
   a suction body with an adjoining suction plate having a front side facing away from the suction body and an outer peripheral edge;
   the suction body comprising a plurality of entry channels, through which a gaseous medium is introducible through the suction body toward the front side of the suction plate and into a deflection channel, which is one of:
   delimited on one side by the front side of the suction plate and on another side by a deflection head of a deflection unit, or
   delimited on one side by the front side of the suction plate and on another side by the object when the object is suctioned, wherein the deflection channel is arranged so that the gaseous medium is guidable to outside the outer peripheral edge; and
   a deflection chamber, which is arranged in a center of the suction plate, and which is adjoined on one side by the plurality of entry channels and on another side by a plurality of suction channels which are sunk into the suction plate and extend towards the outer peripheral edge of the suction plate,
   wherein the suction body is constructed in one piece,
   wherein the plurality of entry channels branch from an inlet channel,
   wherein the plurality of entry channels run inside the suction body inclined outwards towards the suction plate, and
   wherein the deflection unit has a pin-shaped mounting element which adjoins the deflection head and is held in a mounting channel or the inlet channel.

2. The suction unit according to claim 1, wherein a channel cross-section of at least one of the suction channels one of:
   increases from the inside to the outside by a factor which is in the range of 1.5-10, or
   is at least approximately constant at least between the channel ends of the suction channels and that the suction channels are peripherally opened or closed after coupling of an object unit.

3. The suction unit according to claim 1, wherein only one deflection chamber equipped with a deflection head is arranged in the suction plate, wherein the plurality of suction channels are assigned to the only one deflection chamber and extend toward the outer peripheral edge along a straight line path or a curved path.

4. The suction unit according to claim 1, wherein the plurality of entry channels are arranged at regular or irregular distances from one another.

5. The suction unit according to claim 1, wherein one or more outlet channels extend through the suction body to outlet openings, which outlet openings are arranged distributed inside the suction channels, outside the suction channels or inside and outside the suction channels and through which outlet openings a gaseous medium is guidable in the direction of the suction plate.

6. The suction unit according to claim 1, wherein at least the border region of the suction plate made of an elastic material is lamellar and flexible and/or that at least one of the parts of the suction unit are made of a transparent material.

7. The suction unit according to claim 1, wherein the suction body is connected to a suction basket, the inner side of which suction basket adjoins the suction plate or is spaced from the suction plate, wherein the suction basket encloses a receiving channel which has a channel opening which is dimensioned in such a way that individual objects can be introduced into the receiving channel or into recesses on the underside of the suction basket.

8. The suction unit according to claim 7, wherein the suction body is connected to a suction bell which encloses the suction body separated by a return channel, which return channel opens on one side into the suction basket provided with the suction bell and on another side into at least one outlet opening provided in the wall of the suction bell or in a mounting plate connected to the suction bell and the suction body.

9. The suction unit according to claim 7, wherein the suction basket is provided with at least one wall opening which is always open or can be closed off completely or partially by a closing element.

10. The suction unit according to claim 1, wherein a channel opening of a suction basket is enclosed by an annular plate which is aligned perpendicularly or inclinedly with respect to the suction basket and, on the underside facing away from the suction basket, has suction channels which are recessed into the annular plate and have a constant or changing cross-sectional profile.

11. The suction unit according to claim 1, wherein a centering device is provided within the suction basket and is connected to the deflection unit, the suction body or the suction basket.

12. The suction unit according to claim 1, wherein the deflection head has a circumferential groove-shaped depression on the side facing the suction plate.

13. A suction device with at least one suction unit according to claim 1 with a medium pressure device for generating a flow of a gaseous medium, which is guidable through the suction unit or is guidable through the suction unit and is returnable to the pressure device through a return channel.

14. The suction device according to claim 13, wherein a distribution device is provided, which is designed in the manner of a block, a cylinder or a cylinder segment, and which holds a plurality of uniformly distributed suction units, to which compressed air can be supplied jointly via at least one distribution duct or individually via at least one pressure line.

15. The suction device according to claim 13, wherein the distribution device comprises receiving chambers, each of which receiving chambers is open towards the distribution channel through at least one chamber opening and in each of which receiving chambers a suction unit is arranged, which rests in a tightly sealing manner against the border of the chamber opening by a sealing ring and which is releasably held in abutment against the sealing ring by a locking element.

16. The suction unit according to claim 1, further comprising additional deflection chambers, each equipped with a deflection head, arranged in the suction plate, wherein one or more of the plurality of suction channels are individually assigned to one or more of the additional deflection chamber and extend to the outer peripheral edge along a straight line path or along a curved path.

* * * * *